(12) United States Patent
Jakobsson et al.

(10) Patent No.: US 8,949,989 B2
(45) Date of Patent: *Feb. 3, 2015

(54) AUDITING A DEVICE

(75) Inventors: Bjorn Markus Jakobsson, Mountain View, CA (US); Karl-Anders R. Johansson, Malmo (SE)

(73) Assignee: QUALCOMM Incorporated, San Diego, CA (US)

( * ) Notice: Subject to any disclaimer, the term of this patent is extended or adjusted under 35 U.S.C. 154(b) by 612 days.

This patent is subject to a terminal disclaimer.

(21) Appl. No.: 13/044,365

(22) Filed: Mar. 9, 2011

(65) Prior Publication Data

US 2013/0024936 A1    Jan. 24, 2013

Related U.S. Application Data

(63) Continuation-in-part of application No. 12/580,891, filed on Oct. 16, 2009, now Pat. No. 8,375,442.

(60) Provisional application No. 61/234,604, filed on Aug. 17, 2009, provisional application No. 61/311,999, filed on Mar. 19, 2010.

(51) Int. Cl.
| | |
|---|---|
| *G06F 11/00* | (2006.01) |
| *G06F 21/55* | (2013.01) |
| *G06F 21/56* | (2013.01) |
| *G06F 21/57* | (2013.01) |

(52) U.S. Cl.
CPC ............ *G06F 21/554* (2013.01); *G06F 21/56* (2013.01); *G06F 21/57* (2013.01); *G06F 2221/2115* (2013.01); *G06F 2221/2123* (2013.01)
USPC ............... 726/23; 726/22; 726/24; 713/188; 713/189

(58) Field of Classification Search
USPC ................. 726/22–24; 713/188, 189
See application file for complete search history.

(56) References Cited

U.S. PATENT DOCUMENTS

| | | | |
|---|---|---|---|
| 5,812,483 A | | 9/1998 | Jeon et al. |
| 5,978,273 A | * | 11/1999 | Shigemura ............... 365/185.29 |
| 7,315,826 B1 | | 1/2008 | Guheen et al. |
| 7,917,820 B1 | * | 3/2011 | Pavle et al. ................. 714/727 |
| 7,967,215 B2 | | 6/2011 | Kumar et al. |
| 8,118,218 B2 | | 2/2012 | Koh et al. |

(Continued)

FOREIGN PATENT DOCUMENTS

| | | |
|---|---|---|
| JP | 2006127521 A | 5/2006 |
| JP | 2008501964 A | 1/2008 |

(Continued)

OTHER PUBLICATIONS

Castelluccia et al., On the Difficulty of Software-Based Attestation of Embedded Devices. Proceedings of the 16th ACM Conference on Computer and Communications Security (CCS), 2009.

(Continued)

*Primary Examiner* — Mohammad A Siddiqi
(74) *Attorney, Agent, or Firm* — Loza & Loza, LLP

(57) ABSTRACT

The auditing of a device that includes a physical memory is disclosed. One or more hardware parameters that correspond to a hardware configuration is received. Initialization information is also received. The physical memory is selectively written in accordance with a function. The physical memory is selectively read and at least one result is determined. The result is provided to a verifier.

36 Claims, 26 Drawing Sheets

(56) References Cited

U.S. PATENT DOCUMENTS

| | | | |
|---|---|---|---|
| 8,243,541 B2* | 8/2012 | Cho et al. ............... | 365/203 |
| 8,370,935 B1 | 2/2013 | Jakobsson et al. | |
| 8,375,442 B2 | 2/2013 | Jakobsson et al. | |
| 8,544,089 B2 | 9/2013 | Jakobsson et al. | |
| 2003/0145228 A1 | 7/2003 | Suuronen et al. | |
| 2005/0097094 A1 | 5/2005 | Silverbrook et al. | |
| 2005/0188218 A1 | 8/2005 | Walmsley et al. | |
| 2006/0090209 A1 | 4/2006 | Garay et al. | |
| 2006/0219776 A1 | 10/2006 | Finn | |
| 2006/0262737 A1 | 11/2006 | Livet et al. | |
| 2006/0278694 A1 | 12/2006 | Jha et al. | |
| 2007/0088906 A1 | 4/2007 | Mizushima et al. | |
| 2008/0034406 A1 | 2/2008 | Ginter et al. | |
| 2008/0065555 A1 | 3/2008 | Mullen | |
| 2008/0082825 A1 | 4/2008 | Mizushima et al. | |
| 2008/0098457 A1 | 4/2008 | Carter | |
| 2008/0129450 A1 | 6/2008 | Riegebauer | |
| 2008/0184371 A1 | 7/2008 | Moskovitch et al. | |
| 2008/0229415 A1 | 9/2008 | Kapoor et al. | |
| 2008/0260154 A1 | 10/2008 | Smierschalski et al. | |
| 2009/0013125 A1 | 1/2009 | Mizushima et al. | |
| 2009/0109959 A1 | 4/2009 | Elliott et al. | |
| 2009/0122755 A1 | 5/2009 | Seok et al. | |
| 2009/0199206 A1 | 8/2009 | Finkenzeller et al. | |
| 2009/0287922 A1 | 11/2009 | Herwono et al. | |
| 2010/0011029 A1 | 1/2010 | Niemelae | |
| 2010/0031360 A1* | 2/2010 | Seshadri et al. ............... | 726/24 |
| 2010/0216434 A1 | 8/2010 | Marcellino et al. | |
| 2010/0291896 A1 | 11/2010 | Corda | |
| 2010/0323678 A1 | 12/2010 | Corda et al. | |
| 2011/0023115 A1 | 1/2011 | Wright | |
| 2011/0219451 A1 | 9/2011 | McDougal et al. | |
| 2011/0320816 A1 | 12/2011 | Yao et al. | |
| 2012/0099497 A1 | 4/2012 | Vaidya et al. | |
| 2012/0129452 A1 | 5/2012 | Koh et al. | |
| 2013/0064236 A1 | 3/2013 | Ji et al. | |
| 2014/0101765 A1 | 4/2014 | Jakobsson et al. | |

FOREIGN PATENT DOCUMENTS

| | | | |
|---|---|---|---|
| JP | 2008514150 A | 5/2008 | |
| JP | 2009543186 A | 12/2009 | |
| JP | 2009544098 A | 12/2009 | |
| WO | 0131421 | 5/2001 | |
| WO | WO-2006032993 A2 | 3/2006 | |
| WO | WO-2008005067 A1 | 1/2008 | |
| WO | WO-2008010853 A1 | 1/2008 | |
| WO | 2008048665 | 4/2008 | |
| WO | WO-2009031065 A1 | 3/2009 | |

OTHER PUBLICATIONS

Choi et al., Proactive Code Verification Protocol in Wireless Sensor Network. In ICCSA (2), pp. 1085-1096, Aug. 26-29, 2007. Cover sheet is from Computational Science and Its Applications-ICCSA 2007.

C.Dwork et al., On Memory-Bound Functions for Fighting Spam. In Crypto, pp. 426-444. Springer-Verlag, 2002.

Ferguson et al., The Skein Hash Function Family, Version 1.2, Sep. 15, 2009.

Garay et al., Software Integrity Protection using Timed Executable Agents. In ASIACCS '06: Proceedings of the 2006 ACM Symposium on Information, Computer and Communications Security, pp. 189-200, New York, NY, USA, 2006. ACM.

Gardner et al., On the Difficulty of Validating Voting Machine Software with Software. In EVT'07: Proceedings of the USENIX Workshop on Accurate Electronic Voting Technology, pp. 11-11, Berkeley, CA, USA, 2007. USENIX Association.

Gratzer et al., Alien vs. Quine, The Vanishing Circuit and Other Tales from the Industry's Crypt, IEEE Security and Privacy, 5(2):26-31, 2007.

Gu et al., Remote Attestation on Program Execution. In STC '08: Proceedings of the 3rd ACM Workshop on Scalable Trusted Computing, pp. 11{20, New York, NY, USA, Oct. 31, 2008. ACM.

Fritz Hohl, Time Limited Blackbox Security: Protecting Mobile Agents from Malicious Hosts, 1998.

Jakobsson et al., Assured Detection of Malware with Applications to Mobile Platforms. In DIMACS Technical Report 2010-03, Feb. 2010.

Jakobsson et al., Server-Side Detection of Malware Infection. In New Security Paradigms Workshop (NSPW), Sep. 8-11, 2009.

Kennell et al., Establishing the Genuinity of Remote Computer Systems. In SSYM'03: Proceedings of the 12th Conference on USENIX Security Symposium, pp. 21{21, Berkeley, CA, USA, 2003. USENIX Association.

Monrose et al., Distributed Execution with Remote Audit. In Proceedings of the 1999 ISOC Network and Distributed System Security Symposium, pp. 103-113, 1999.

Rivest et al., The MD6 hash function — A Proposal to NIST for SHA-3. Submission to NIST, Feb. 20, 2009.

Scandariato et al., Application-Oriented Trust in Distributed Computing. In Third International Conference on Availability, Reliability and Security, (ARES 08), pp. 434-439, 2008.

Schellekens et al., Remote Attestation on Legacy Operating Systems with Trusted Platform modules. In Science of Computer Programming, pp. 13-22, 2008.

Seshadri et al., SAKE: Software Attestation for Key Establishment in Sensor Networks. pp. 372-385. 2008.

Seshadri et al., SCUBA: Secure Code Update by Attestation in Sensor Networks. In WiSe '06: Proceedings of the 5th ACM Workshop on Wireless Security, pp. 85-94, New York, NY, USA, Sep. 29, 2006. ACM.

Seshadri et al., Pioneer: Verifying Code Integrity and Enforcing Untampered Code Execution on Legacy Systems. In SOSP '05: Proceedings of the Twentieth ACM Symposium on Operating Systems Principles, pp. 1-16, New York, NY, USA, Oct. 23-26, 2005. ACM Press.

Seshadri et al., SWATT: SoftWare-Based ATTestation for Embedded Devices. In Proceedings of the IEEE Symposium on Security and Privacy, 2004.

Seshadri et al., Using Software-Based Attestation for Verifying Embedded Systems in Cars, 2004 Embedded Security in Cars Workshop (Escar 2004), 2004.

Shaneck et al., Remote Software-Based Attestation for Wireless Sensors. In ESAS, pp. 27-41, 2005.

Shankar et al., Side Effects are not Sufficient to Authenticate Software. In in Proceedings of the 13th USENIX Security Symposium, pp. 89-101, Aug. 2004.

Shi et al., Bind: A Fine-Grained Attestation Service for Secure Distributed Systems. In SP '05: Proceedings of the 2005 IEEE Symposium on Security and Privacy, pp. 154-168, Washington, DC, USA, 2005. IEEE Computer Society.

Yang et al., Distributed Software-Based Attestation for Node Compromise Detection in Sensor Networks. In SRDS '07: Proceedings of the 26th IEEE International Symposium on Reliable Distributed Systems, pp. 219-230, Washington, DC, USA, 2007. IEEE Computer Society.

Bickford et al., Rootkits on Smart Phones: Attacks and Implications, Copyright 2009, ACM 978-1-60558431, Jul. 9, 2009.

Nilsson et al., A Framework for Self-Verification of Firmware Updates over the AIR in Vehicles ECU's, IEEE, 2008.

International Search Report—PCT/US2010/02214—ISA/EPO—Oct. 15, 2010.

Supplementary European Search Report—EP09154231—Search Authority—Munich—Sep. 19, 2013.

Nishihara S., "Learning Data Structure and Algorithm by C", Ohmsha Ltd., Jan. 20, 2008, First Edition, pp. 186-187.

* cited by examiner

```
for i:=1 to rounds
  for k:=0 to chunks_per_block -1
    permutation[1  number_blocks] := get_permutation
    for j:= 1 to number_blocks
      modify_memory(permutation[j]*chunks_per_block+k, next_string_chunk)
```

FIG. 7

$state \leftarrow 0$
$location \leftarrow 0$
repeat ($sRAM/period/\alpha$) times:
   receive value $key$
   $state \leftarrow state$ XOR $key$
   repeat $period$ times:
     $data \leftarrow$ RAM[$location$]    % read a cache line
     $state \leftarrow$ ROR($state$ XOR $data$)    % accumulation
     $data \leftarrow$ RAM[$location + 1$]    % read from cache
     $state \leftarrow$ ROR($state$ XOR $data$)    % accumulation
     ...
     $data \leftarrow$ RAM[$location + \alpha - 1$]    % read from cache
     $state \leftarrow$ ROR($state$ XOR $data$)    % accumulation
     $location \leftarrow (location + step) \bmod sRAM$    % next location?
report value $state$

FIG. 13

```
counter ← 0
time ← 0
repeat period times:
    counter ← counter + 1
    repeat until value state is received:
        time ← time + 1
        if time = maxtime then
            duration(counter) ← ⊥
            counter ← counter + 1
    if state = input(counter) then
        duration(counter) ← time
        respond with value output(counter)
    else
        duration(counter) ← ⊥
```

FIG. 14

AUDITING A DEVICE

CROSS REFERENCE TO OTHER APPLICATIONS

This application is a continuation in part of co-pending U.S. patent application Ser. No. 12/580,891 entitled AUDITING A DEVICE filed Oct. 16, 2009, which is incorporated herein by reference for all purposes, which claims priority to U.S. Provisional Application No. 61/234,604 entitled DETECTION OF MALWARE filed Aug. 17, 2009 which incorporated herein, in its entirety, by reference for all purposes. This application also claims priority to U.S. Provisional Patent Application No. 61/311,999 entitled AUDITING A DEVICE filed Mar. 9, 2010 which is incorporated herein by reference for all purposes.

BACKGROUND OF THE INVENTION

Existing techniques for detecting the presence of unauthorized programs are typically resource-intensive. For example, they generally require constant updates (e.g., of blacklists) and periodic or continuous scans for problems. The situation is exacerbated if the device being protected by such techniques has limited resources, such as limited memory, or by being powered by a battery. As one example, a device with limited resources may not be able to store definitions for detecting all known unauthorized programs. As another example, scanning for unauthorized programs is typically a power-intensive act, and may quickly deplete the battery of a battery-powered device. In some environments, a central authority is used to facilitate the discovery of unauthorized programs. One drawback of this approach is that it typically requires that the device being protected compile detailed logs of device activities. Generating such logs is resource-intensive (e.g., requiring large amounts of disk storage; processing power to assemble the log data; and the bandwidth to deliver the log data to the central authority) and can also present privacy problems.

Existing techniques for detecting the presence of unauthorized programs are also generally vulnerable to attempts by such programs to cause incorrect reporting. For example, a rootkit can "listen in" to requests by applications to the operating system, and may modify these requests and their responses. If an application requests information about what processes are running, a malicious rootkit application can avoid detection by removing information about itself from the report that is returned by the operating system.

Existing techniques for screening against the installation or execution of unauthorized programs are also known to be vulnerable to new instances of malware that may not immediately be detectable due to a lack of information about their structure and functionality. Therefore, and irrespective of the resources available to the device, if the unauthorized program is sufficiently sophisticated and/or has not previously been encountered, it can evade detection and cause undetected harm. And, if the unauthorized program has intentionally been installed by the user to bypass detection (e.g., to facilitate software piracy), traditional techniques may fail to locate the unauthorized program, or any other unauthorized activities.

BRIEF DESCRIPTION OF THE DRAWINGS

Various embodiments of the invention are disclosed in the following detailed description and the accompanying drawings.

FIG. 7 illustrates an example of pseudo code for use in conjunction with auditing a device.

FIG. 13 illustrates an embodiment of an implementation of a process for selectively reading memory.

FIG. 14 illustrates an embodiment of an implementation of a process for timing a portion of a device audit.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
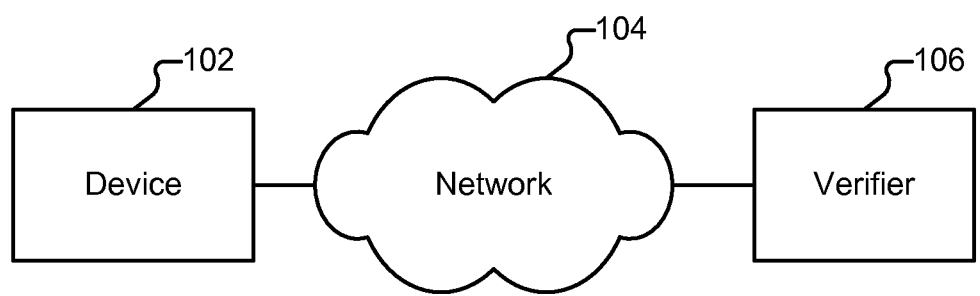
FIG. 1 illustrates an embodiment of an environment in which device auditing is provided.

FIG. 1 illustrates an embodiment of an environment in which device auditing is provided. In the example shown, device 102 is a cellular telephone. Device 102 is in communication (e.g. via network 104) with verifier 106. In FIG. 1, device 102 communicates with verifier 106 via a 3 G network. Verifier 106 is under the control of a carrier, such as a provider of telephony service to device 102. Verifier 106 includes a database of hardware configuration information, including an entry corresponding to device 102 and the amount of RAM included on device 102.

As will be explained in more detail below, device 102 can be audited such that any evasive programs (e.g., malware) present on the device can be detected and/or removed. In some embodiments this is accomplished through the undertaking of a sequence of modifications to physical memory included on device 102. Results associated with the performance of the memory modifications are verified by verifier 106. Once device 102 is determined to be free of influence of such evasive programs, additional scans can be performed, which are also described in more detail below. For example, in addition to detecting malware (e.g., software installed without a user's knowledge and/or consent), the techniques described herein can detect "jailbreaking" actions (e.g., privilege escalations) taken by the user, such as to circumvent digital rights management installed by a carrier or hardware manufacturer.

A variety of devices can be used in conjunction with the techniques described herein. For example, in some embodiments device 102 is a video game console. The video game console is configured to communicate with a verifier under the control of the manufacturer of the game console via the Internet (104). If the owner of device 102 makes an unauthorized change to device 102 (e.g., by using a modification chip), verifier 106 will be able to detect the modification accordingly.

Other examples of devices that can be used in conjunction with the techniques described herein include desktop computers, notebook computers, netbooks, personal digital assistants, video playback devices (e.g. televisions, DVD players, portable video players), routers, access points, settop boxes, medical devices, and virtually any other device that includes a processor and a memory.

In various embodiments, verifier 106 is controlled by a user of device 102, instead of by a separate entity. For example, a desktop computer owned by the user of device 102 can be configured to provide verification services to device 102. In that scenario, device 102 can be configured to communicate with the verifier via a local network. Device 102 can also be configured to communicate with verifier 106 directly (e.g., via a dedicated cable) and network 104 is omitted as applicable.

In some embodiments a verifier is collocated with or otherwise directly coupled to device 102. For example, a subscriber identity module ("SIM") card inserted into a cellular phone can be configured to provide the functionality of verifier 106 to the cellular phone. As another example, the functionality of verifier 106 can be integrated into a power cord used to charge a cellular phone. In such embodiments, an external verifier can either be omitted, or can be used in addition to the verification services provided by the collocated/coupled verifier. As one example, suppose device 102 is a personal video player with integrated WiFi capabilities. A power cord used to charge the device can be configured to provide verification services to the device each time it is charged. In addition, if the WiFi radio is active, the device can be configured to communicate periodically with a verifier provided by the manufacturer of the device. As another example, a verifier 106 can be included on a USB device that is periodically inserted by a user into a laptop 102. In addition, whenever a user of laptop 102 attempts to conduct banking transactions with an online bank, the bank can also provide verification services to the laptop 102 prior to granting access to the user's account. As yet another example, a network operator or service provider can require a user to have his or her machine audited before he or she is allowed on the network or allowed to access a service. User can also initiate an audit, for example, after realizing that he or she has been exposed to a potentially risky situation. One way a user can initiate an audit is to select a menu option on the device. Another example way is for the user to request an audit from verifier 106 (e.g., by submitting an online request through a web form).

Figure 2:
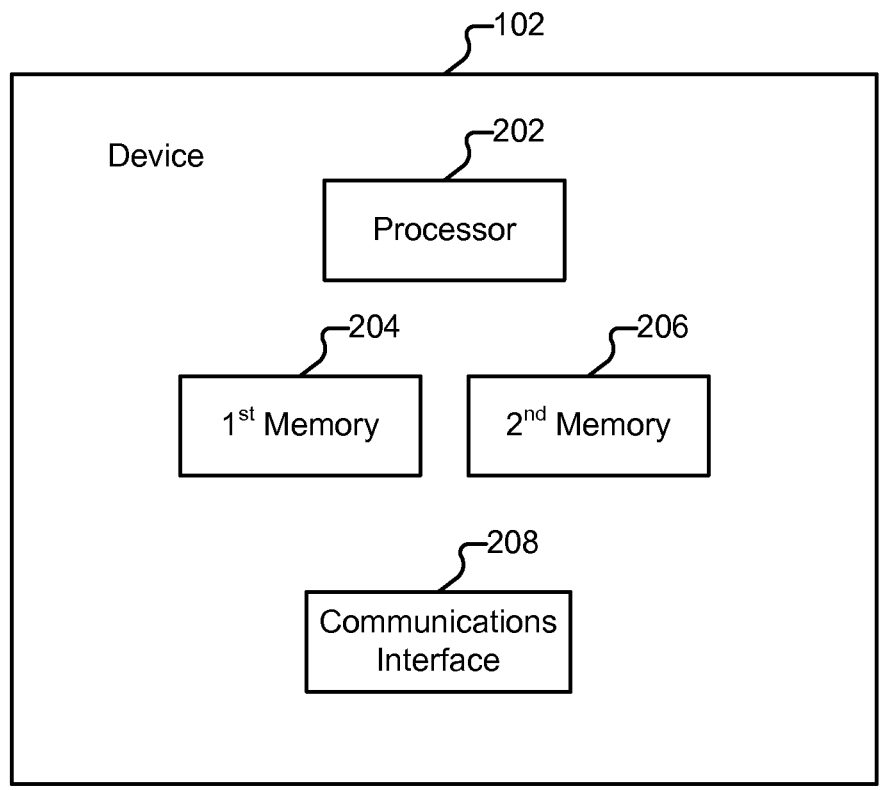
FIG. 2 illustrates an embodiment of a device.

FIG. 2 illustrates an embodiment of a device. In the example shown, device 102 includes a processor 202, a first memory 204, a second memory 206, and a communications interface 208. As one example, device 102 includes a 528 Mhz ARM processor (202), 128 MB of RAM (204), a micro SD card slot into which a user has inserted a 1 GB micro SD card (206), and a 3 G modem (208). Memory 204 is also referred to herein as "fast" memory. Memory 206 is also referred to herein as "slow" memory. However, memories 204 and 206 need not be different speeds. Other components may also be included in device 102, such as a GPS receiver (not shown). Elements, such as second memory 206, may also be omitted as applicable. One may refer to RAM that can contain active programs as fast, and consider RAM that can only store data as slow.

Using the auditing techniques described herein, the absence of active processes in fast memory can be verified. And, after that verification has been completed, all memory (e.g., both fast and slow) can be scanned to identify, classify, report and potentially modify the contents of the fast and slow memory, or portions thereof. The distinction between fast and slow memory can be made in a variety ways. For example, on a device with RAM, flash memory and a hard drive, it is possible to treat only the RAM as fast memory and flash memory and the hard drive as slow memory. It is also possible to treat both the RAM and the flash memories as fast memory and the hard drive as slow memory. It is also possible to consider all memory physically located on a given device as being fast, and all external memory accessible (or potentially accessible) by the device as slow. The turnaround time to communicate to external components will cause such external accesses to be slower, irrespective of the type and actual local access speed of the external memory. Depending of what types of memory are treated as fast vs. slow, the selection of parameters would be done accordingly.

As will be described in more detail below, the existence of unauthorized modifications to device 102 can be detected by configuring device 102 to run a series of modifications to memory 204 and examining the results. If for example, the time it takes to perform the modifications exceeds a tolerance of a predetermined length of time, or if a result determined in conjunction with the modifications does not match an expected result, the presence of an evasive program may be indicated. In various embodiments, the memory modifications are performed across all memory on a device (e.g. both memory 204 and memory 206), instead of being run only on fast memory such as memory 204.

Figure 3:
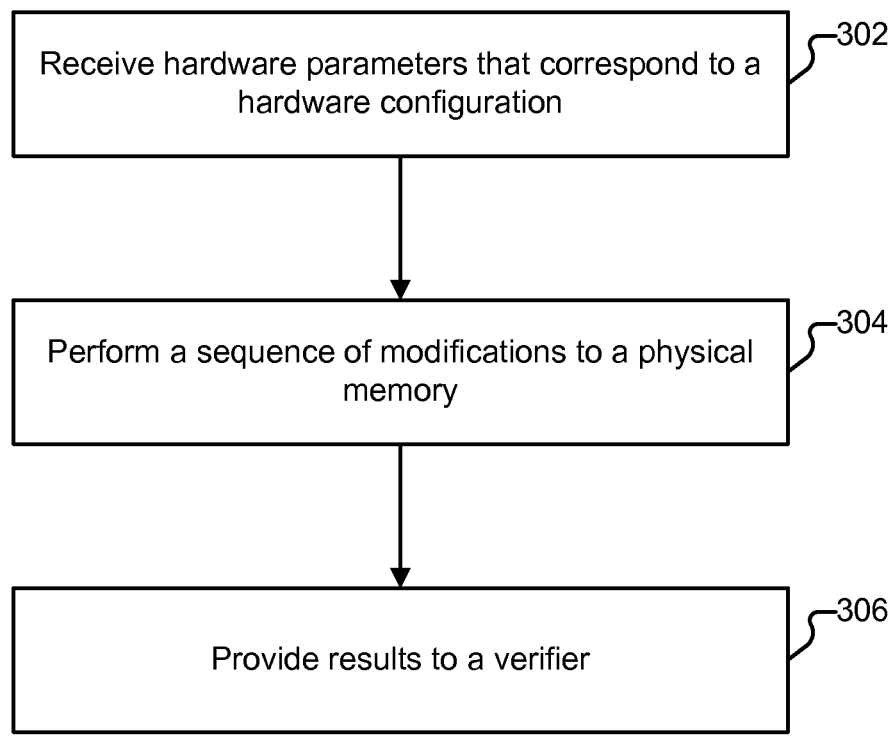
FIG. 3 illustrates an embodiment of a process for performing a device audit.

FIG. 3 illustrates an embodiment of a process for performing a device audit. In various embodiments, the process shown in FIG. 3 is performed by device 102. The process shown in FIG. 3 can be initiated in a variety of ways. For example, the process can be initiated every time the user charges the device (e.g., by configuring the device to initiate the process when it detects a power supply). The process can also be initiated in response to the occurrence of a particularly large or unusual transaction, in response to a concern that the user is at risk (e.g., in response to the carrier receiving notification that a new vulnerability has been released by a nefarious individual), in response to the elapsing of a certain amount of time, etc. Additional examples of events that can trigger the initiation of the process shown in FIG. 3 include an attempt by the user of device 102 to make a payment or otherwise engage in a financial transaction, an authentication attempt (e.g., the user of the device attempting to access to a bank account), and an access request being performed (e.g., a request for the download of a movie to the device).

The process begins at 302 when one or more hardware parameters that correspond to a hardware configuration is received. Example hardware parameters include the amount and the speed of fast memory 204. For example, in the case of the device shown in FIG. 2, the hardware parameters would include "amount=128M" and "speed=300 Mhz." Additional parameters that can be used include the number of cores, the type of bus, etc.

The hardware parameters can be received in a variety of ways. As one example, the SIM of a cellular phone can be configured to detect the amount and speed of installed memory. As another example, if a proprietary cable is used to connect device 102 to a power source (or to a computer or other device), the parameters may be known (and thus "received") by virtue of the cable only working in conjunction with a device having a specific amount and speed of memory. As yet another example, a serial number of a device may indicate the amount and speed of fast memory 204 installed on a device. In various embodiments, the user (or a representative thereof) is requested to input memory parameters in a web form or a configuration file. Assumptions can also be made about the likely memory configuration of the device and a benchmarking program can be run to confirm whether the assumption is likely to be correct.

At 304, a sequence of modifications to a physical memory is performed. Examples of ways in which such modifications can be performed are described in more detail below. In some embodiments the sequence of modifications to be performed is determined by the verifier. The set of modifications to be made can be provided to the device in a variety of ways. For example, the sequence can be constructed on the device based on a seed value. The sequence can be pre-loaded onto the device at time of manufacture, at time of delivery to the supplier or carrier, or at the time of purchase. It can also be loaded by user choice or by a service provider at any time after purchase (e.g., as an over-the-update or as a firmware update), or when needed to perform an audit. The parameterization can be performed by the manufacturer or supplier or carrier, given known specifications. It can also be performed through a lookup, e.g., of serial number, by a user or service provider. The parameters can be associated with the model or device name. If the device is reconfigured, e.g., by replacement or addition of components, then these new components can carry information about the new or additional parameterization. The components can also carry the entire set of instructions, instead of just the parameters. Alternatively, the serial numbers, names, or types of components can indicate the needed change in parameters. If it is believed that the client device is secure at the time of installation of the algorithm or a new component, then the client machine can also inquire what components are installed (as is typically done as a system is booted up), and set the parameters accordingly.

In various embodiments, device manufacturers offer to preload non-activated auditing software at no cost, and later request payment to activate auditing services (and/or the additional scanning services described in more detail below. The auditing software can subsequently be activated by carriers, on request by end users or service providers. The carrier collects payment for the activation and optionally forwards portions of the payment to the handset manufacturer, providers of auditing software, providers of additional scanning software (e.g., antivirus detection services), and any other parties involved in the transaction.

At 306, one or more results of the portion of the process performed at 304 are reported to a verifier. In some embodiments results are provided to proxy 906, which timestamps the results and provides them to the verifier. As will be described in conjunction with FIG. 5, in some embodiments multiple iterations of modifications to the memory and communications with the verifier are made, and the processes shown in FIGS. 3 and 4 are adapted accordingly.

Figure 4:
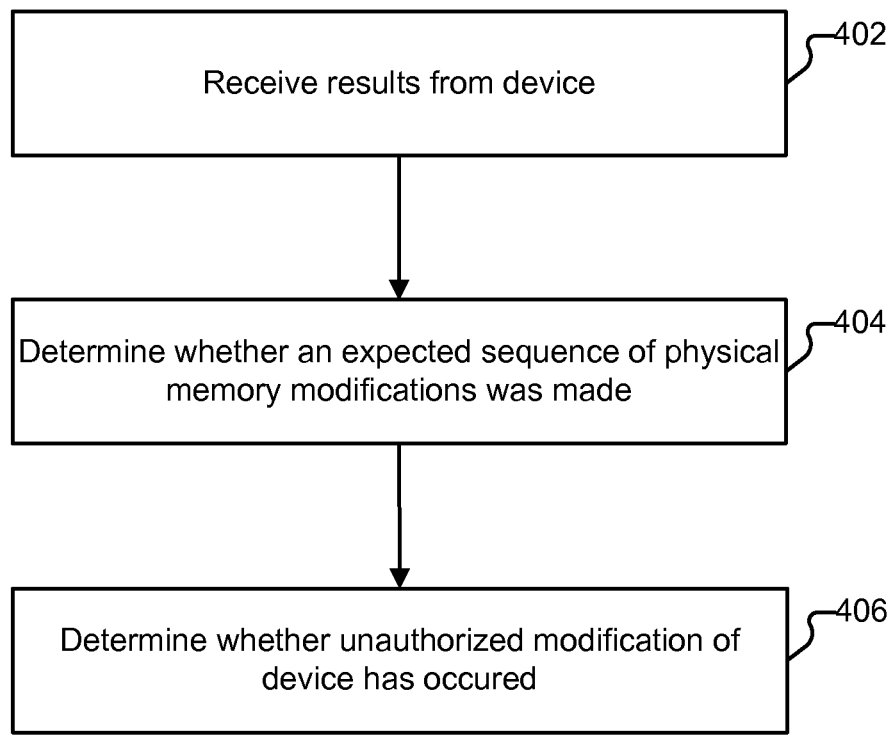
FIG. 4 illustrates an embodiment of a process for performing a device audit.

FIG. 4 illustrates an embodiment of a process for performing a device audit. In various embodiments, the process shown in FIG. 4 is performed by verifier 106. As explained above, in some embodiments the process shown in FIG. 4 is performed by an entity separate from device 102 (such as on a verifier controlled by a carrier). In other embodiments the process is performed by a verifier located on or otherwise physically coupled to device 102.

The process begins at 402 when results are received. For example, when device 102 reports results at 306, those results are received by a verifier at 402.

At 404, a determination is made as to whether the results received at 404 indicate that an expected sequence of physical modifications was made. Verifier 106 is configured with information such as the amount of time the execution of a sequence of memory modifications should take on device 106 (assuming no authorized modifications have been made). In some embodiments verifier 106 is also be configured to store additional information, such as seed values and the results of computations performed by device 102.

If the expected sequence of physical memory modifications is determined to have been made (e.g., device 106 performed the sequence of memory modifications), it is concluded (406) that no unauthorized modifications have been made to the device. And, any evasive processes that might previously have been active on device 102 have been neutralized. If the expected sequence of physical memory modifications is determined to have not been made (e.g., because the amount of time to perform the sequence is off, or computed results are incorrect), it is concluded (406) that an unauthorized modification has been made to the device. (e.g., that an evasive process is present on the device and is attempting to avoid detection). In various embodiments, error correcting codes are used to avoid errors due to network noise. Message-authentication codes and other authentication techniques can be used to avoid active tampering with contents. Encryption techniques can be used to obfuscate contents and make it impossible for eavesdroppers to determine the plaintext messages being transmitted.

Figure 5A:
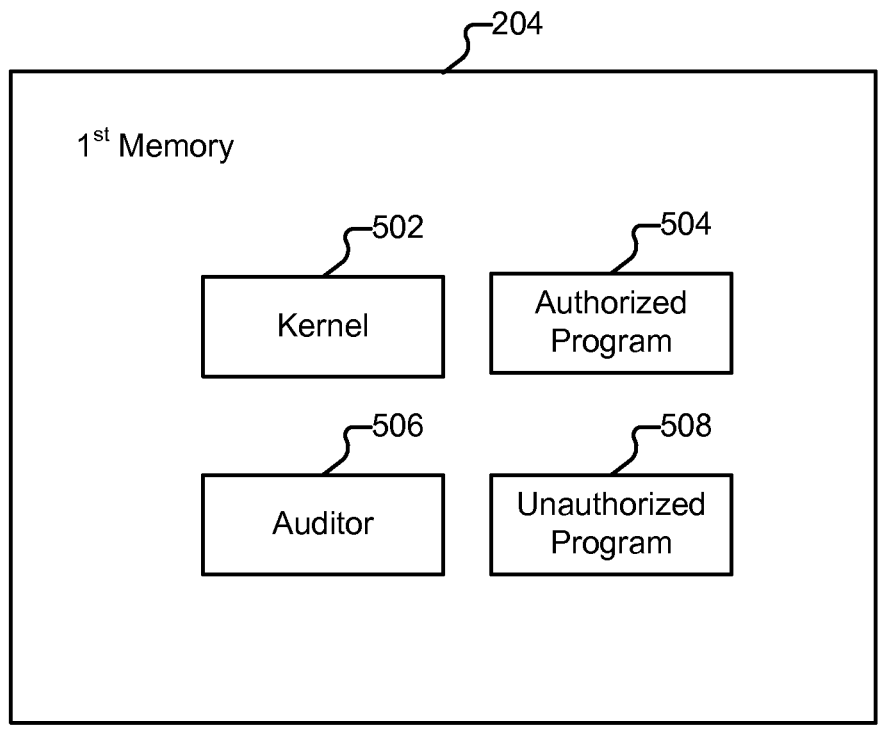
FIG. 5A illustrates a representation of a memory prior to an execution of the process shown in FIG. 3.

FIG. 5A illustrates a representation of a memory prior to an execution of the process shown in FIG. 3. In the example shown, kernel 502, authorized program 504, unauthorized program (e.g., a malware agent) 508, and an auditor program 506 are loaded in RAM. Typically, in order to remain resident on a device, an evasive program needs to do one of two things. It must either remain active in RAM (or swap space), or it must modify a legitimate program, data, or configuration of the device to allow the malware agent to gain control after a scan has been performed. As will be explained in more detail below, using the techniques described herein, the presence of the malware agent can be detected, irrespective of the techniques it employs to evade detection. In addition, using the techniques described herein, the presence of the malware agent can be detected even if auditor 506 is loaded after malware agent 504.

Figure 5B:
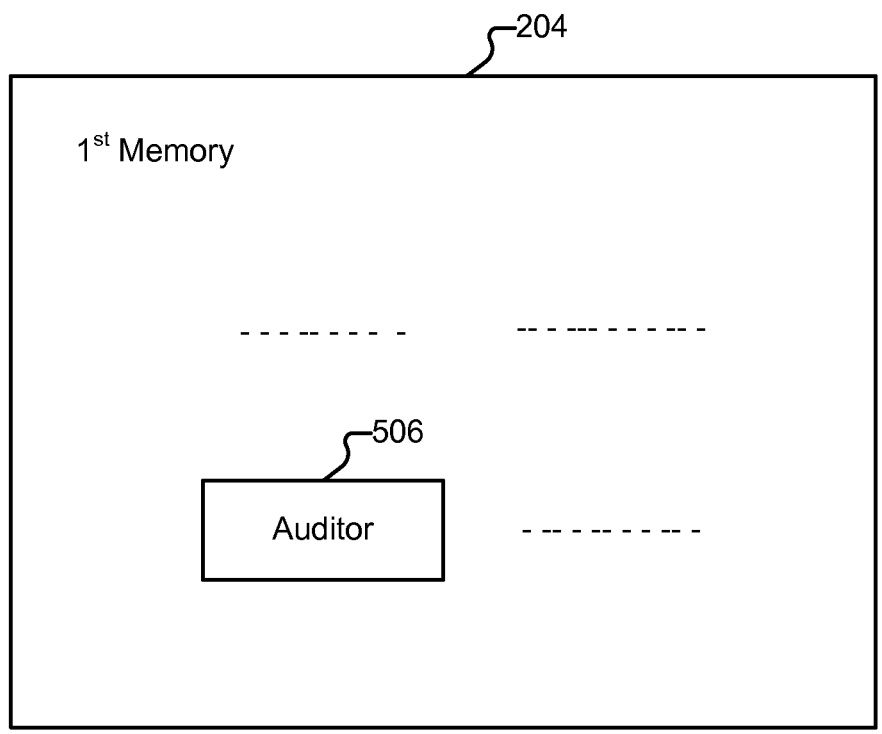
FIG. 5B illustrates a representation of a memory while the process shown in FIG. 3 is occurring.

FIG. 5B illustrates a representation of a memory while the process shown in FIG. 3 is occurring. As will be explained in more detail below, auditor 506 is configured to clear memory RAM (and any swap space) except for the space used by auditor 506. In various embodiments, a minimalistic set of other services is also permitted to occupy RAM. For example, if device 102 supports 3 G communications, the area of RAM occupied by a 3 G driver/module is not cleared, so that auditor 506 can use the 3 G modem to communicate with verifier 106. As another example, in some embodiments a microkernel is permitted to occupy a portion of RAM while auditor 506 clears the remainder of the RAM.

Figure 6:
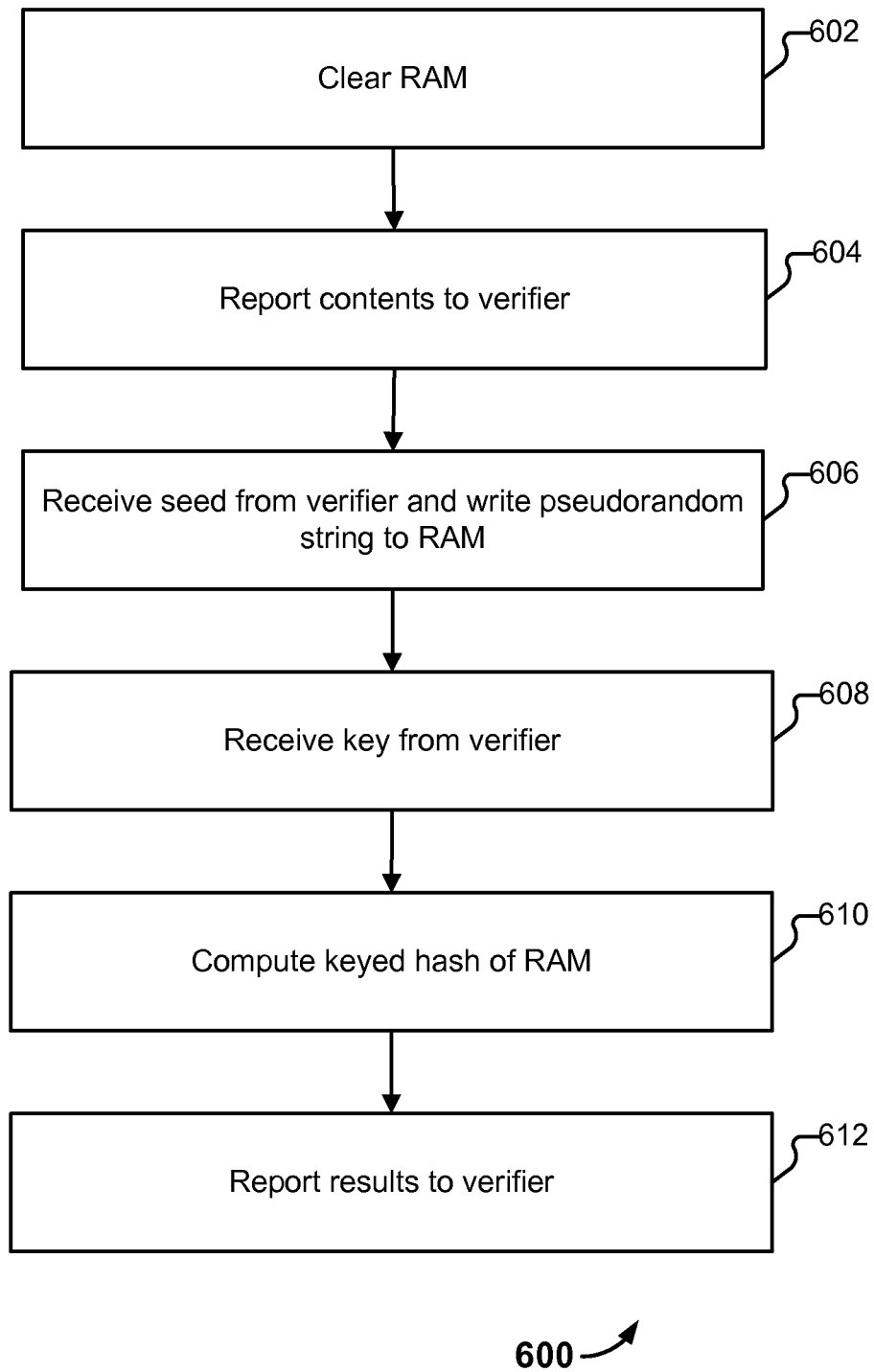
FIG. 6 illustrates an embodiment of a process for performing a device audit.

FIG. 6 illustrates an embodiment of a process for auditing a device. The process begins at 602 when an auditor process running on device such as device 102 clears all portions of memory 204 (and any swap space) that is not claimed for use by the auditor. In some embodiments, this includes unloading the kernel, various drivers, and all other processes. In various embodiments, the unclaimed memory space is overwritten by a sequence instead of being cleared (e.g., with zeros). One example sequence is a pseudo-random sequence that is combined with the original memory contents, such as by using the XOR operation. This allows the unclaimed memory space to later be reconstituted by the repeated combination with a pseudo-random sequence that complements or equals the previously used pseudo-random sequence. The unclaimed memory space can also be overwritten with contents in a way that clears it, but which does not correspond to the typical erasing operation of the device. For example, it is possible to clear unclaimed memory by writing a sequence of 01010101 to it, or any other appropriate sequence.

In some embodiments, the auditor code comprises two components: a loader and a variable algorithm segment. The task of the loader is to load algorithm segments from non-RAM storage (e.g., something other than memory 204), and hand over control to the loaded algorithm segment. After an algorithm segment has completed, it hands back the control to the loader.

At 604, contents of memory 204 are reported to verifier 106. In some embodiments the entire contents are reported. In other embodiments, only descriptions of changes since the last audit are communicated.

At 606, the device receives a cryptographic seed from the verifier. The seed is expanded to a pseudorandom string and the string is written to RAM. An example technique for writing a string to RAM in accordance with portion 606 of process 600 is provided below.

At 608, the device receives a cryptographic key from the verifier.

At 610, the device uses the received key to compute a keyed hash of the entire contents of the device's RAM.

At 612, the device reports the resulting value to the verifier. Verifier 106 evaluates the results, e.g., according to the process shown in FIG. 4.

In various embodiments, device 102 reports state information from computations at 606 and 610 at time intervals set by verifier 106. The use of such intervals provides assurance that the computations performed by device 102 are being performed within memory 204 (and not, e.g. a portion of memory 206).

Device 102 obtains updates, from verifier 106, of the seed and respective key on an as-needed basis. The use of updates provides assurance that device 102 is not outsourcing computation to an external fast resource. For example, in order to outsource the computation, an evasive program would have to forward the seed and key updates to the external device, which would introduce a measurable delay.

Verifier 106 verifies that both the final function value and partial results are correct and are reported by device 102 to the verifier within acceptable time bounds. An example technique for evaluating the time it takes an auditor to perform its tasks is provided below. As mentioned above, in some embodiments verifier 106 is external to device 102 and is operated by a party other than the owner of the device. In other embodiments, verifier 106 is under the control of the user of device 102.

After the process shown in FIG. 6 has been completed, auditor 506 can restore the contents of the device, whether fully or partially, and return control to previously active processes or to a process performing further scans of memory contents. The contents of the fast memory can be restored if they were swapped out to slow memory prior to the execution of the timed computation, or if the original contents were combined with a string, the latter allowing a similar combination to be performed, thereby recovering the previous state. It is also possible to restart the device by loading a "starting" state. It is further possible to first hand over control to a process that scans, reviews, reports and modifies the contents of memory, or any subset of these operations (described in more detail below). The reporting can be presented to verifier 106, or to a third party, such as one in charge of managing the processing of memory contents. In the latter case, verifier 106 may be in charge of assuring that there is no active malicious process, and the second verifier could be in charge of processing the memory of the device to determine whether it complies with a particular policy, which may be related to malware detection, digital rights management, or another policy identifying what device memory contents are desirable.

Example Adversarial Strategies

In order for an evasive program to avoid being detected, e.g., during portion 604 of the process shown in FIG. 6, it must be active in RAM, either as a unique process (504) or as part of a corrupted version of auditor 506. The following are six example ways in which an evasive program such as malware agent 504 can attempt to remain active:

Strategy 1: Outsource Storage.

The malware agent can stay active in RAM and attempt to remain undetected by causing auditor 106 to not clear the appropriate space (e.g., at 602) and rely on non-RAM storage or external storage to store the corresponding portion of the pseudo-random string generated at 606. The computation at 610 would then be modified to use the outsourced storage instead of the space where the malware agent resides.

Strategy 2: Compute Missing Data.

Instead of outsourcing storage of portions of the pseudo-random string, the malware agent can store a modified representation of the string (e.g., a compressed version, or a version that is missing portions), and reconstitute relevant portions of the string as they are needed during the computation of the keyed hash at 610. Since the malware agent has the seed from which the pseudo-random string is generated, it can use this—or later states of the pseudo-random generator—to regenerate required portions of data.

Strategy 3: Outsource Computation.

The malware agent can forward relevant data to an external device (assuming the necessary communications infrastructure, such as a WiFi connection is still enabled). The external device receives data from device 102 and computes the values needed to report to verifier 106, feeding these values to the malware agent on device 102.

Strategy 4: Modify Detection Code.

The malware agent can attempt to replace the code of auditor 506 with modified code. This replacement code may be designed to suppress reports of compromised memory contents, or contain a hook for malware code to be loaded after the audit completes. The malware agent can attempt to incorporate such changes to auditor 506 without taking up more space by swapping out or compressing portions of the auditor code and loading or unpacking it again as it is needed.

Filling Fast Memory

This section describes an example technique that can be used in conjunction with portion 606 of the process shown in FIG. 6.

FIG. 7 illustrates an example of pseudo code for use in conjunction with auditing a device. In the example shown, the subroutine get_permutation returns a vector indicating a random permutation of number_blocks items, ranging from 0 to number_blocks−1, where number_blocks is the number of portions of size equal to a flash block that the RAM comprises, minus those needed by the auditor. The subroutine next_string_chunk returns a pseudo-randomly generated chunk of bits; the term chunk is used to refer to the amount of data that can be sent on the memory bus. As one example, for an Android G1 phone, a chunk is 32 bits.

Both get_permutation and next_string_chunk use the most recently provided seed as input. The pseudo-random string can be computed as $segment_i \leftarrow hash(segment_{i-1})$ i.e., in a way that cannot be computed using random access. One example is a function based on iterated application of the hash function, given the non-homomorphic properties of hash functions. A variety of hash functions may be used. One example is MD6 in 512-bit mode.

The constant rounds is the number of times a pseudo-random chunk is XORed into the contents of a cell, using the function modify_memory. The choice of rounds controls the amount of work an adversary has to perform to carry out the second adversarial strategy (computing missing data), while also incurring an increasing cost to the honest execution of the algorithm for large values. In the example shown, rounds=2, which results in a noticeably greater cost to the adversary than rounds=1, since the value of each cell will come to depend on two other cells. This can confound memory management strategies of an adversary. In the example shown, chunks_per_block is the number of chunks contained in a flash block, equaling 32768 (=128 kB/32 bits) for an example G1 phone, while number_blocks=1024 (=128 MB/128 kB).

The function modify_memory(pos, string) XORs the contents of position pos with the value string, where pos=0 describes the first chunk of RAM to be operated on, and pos=number_blocks×chunks_per_block−1 is the last chunk.

The memory access structure described in conjunction with FIG. 7 causes accesses to individual pages of randomly ordered blocks, if forced to use flash (e.g., memory 206) instead of RAM (204). This will cause the flash to be cleared with an overwhelming probability, and the pseudo-random access order prevents the adversary from scheduling the memory accesses to avoid this drawback. The cost of a flash-bound computation in comparison to the RAM-bound alternative available to the honest execution of the algorithm is noticeably more time consuming.

In some embodiments, one hash function application is used to generate several invocations of next_string_chunk. This reduces the computational burden associated with the auditing process, which emphasizes the contribution of the memory access in terms of the time to perform the task.

In various embodiments the input to the hash function is a constant number of previous outputs; this complicates storage for a malware agent wishing to reconstitute the state of a given portion of the pseudo-random generator, and is thus useful to further frustrate any attempt to use strategy 2 (compute missing data).

Performing Timing

This section describes an example technique that can be used for timing the execution of auditing tasks. For example, in some embodiments the technique is employed by verifier 106 as described in conjunction with the text corresponding to FIG. 6.

Verifier 106 is configured to time the execution of portions 606 and 610 of the process shown in FIG. 6, e.g., to identify attempts to outsource storage; compute missing data; and outsource computation.

In some embodiments verifier 106 is configured to obtain state information from device 102 at frequent intervals (e.g., that are set by verifier 106). One example of state information is the memory contents of the memory chunk that was last updated, which vouches for that device 102 has reached this stage of the computation. Verifier 106 sends update requests to device 102 at regular intervals. In some embodiments the update requests correspond to updates of the state of the pseudo-random generator used to compute the output of the subroutine next_string_chunk. If the output of the subroutine next_string_chunk is generated by selecting an unused portion from an already generated pseudo-random string, the string can be cleared at the same time, thus forcing the new seed to affect the state immediately.

An evasive program employing adversarial strategy 3 (i.e., outsourcing computation), must transmit the update of the pseudo-random string to the external device that performs the computation, after which the external device has to compute the resulting next value to be reported by device 102 to verifier 106 and transmit this to the evasive program. This incurs a round-trip delay. If the round-trip delay exceeds the time between timing checkpoints, the cheating will be detected. Here, an assumption is made that seeds and keys, along with other status information, is communicated securely between the client device and the verifier. Various cryptographic techniques can be used to achieve this.

In various embodiments, the device-specific time between checkpoints is chosen so that there is not enough time to outsource computation using communications equipment (e.g., WiFi) included on device 102, pessimistically assuming congestion-free environments.

The execution time of modify_memory is determined by the parameter selections described above and what hash function to use to compute next_string_chunk. For example, the MD6 hash function can be configured to different output sizes, from 224 to 512 bits. As explained above, in some embodiments a 512-bit version is used. The time per invocation of modify_memory is noticeably less than the time between checkpoints determined above.

Examples of Detecting Various Evasive Programs

The following section provides examples of how evasive programs employing the various strategies described above can be detected using the techniques described herein.

Defending Against Adversarial Strategy 1—Outsource Storage.

Assume an empty SD card has been inserted into device 102. The corresponding write speed could reach up to 5 MB/s. The size of a block processed by modify_memory as described above is chosen, in this example, to be 128 kB. The time to write the data to the SD card would be 25 ms. In comparison, suppose RAM on device 102 has a write speed of 100 MB/s. The corresponding write time would be 1.25 ms. The additional delay can be readily detected. And, if multiple accesses to the SD card are made between two checkpoints, the additional delay will be even more readily detected.

Defending Against Adversarial Strategy 2—Compute Missing Data.

As mentioned above, the pseudo-random string can be computed in a way that cannot be computed using random access. To compute the value of a certain output, the corresponding input needs to be computed from stored data. Since rounds>1, the data stored in RAM is not this needed state, but a combination of the states of the two or more rounds. The state needs to be explicitly stored (in RAM) by the malware agent, as part of its code space, and the needed state computed from this. This forces the malware agent to compute at least (and in fact, much more) than rounds×number_blocks× chunks_per_block hash operations during the execution of portion 610 of the process shown in FIG. 6, in addition to the computation it needs to perform to "legitimate" computation. For the selected parameter choices, that is more than 100 million hash operations. Given an approximate time of 10 is for computing a hash function invocation, this is about 1000 s, which is approximately 3 orders of magnitude more than the expected and can be detected accordingly.

A sample proof corresponding to the defense against strategy 2 will now be provided. Assume that an evasive program resides in memory 204 and takes up at least portions of some c 32-bit chunks for itself and its variables. A pessimistic assumption can be made that all of this space can effectively be used to store variables, which is not possible, but which gives a lower bound on the amount of work that the malware has to perform to remain undetected. In reality, its effort is greater as not all c chunks can be used for storage, but some are needed to store its code.

For each one of the c hits to RAM chunks that do not contain the values needed to compute the function, the malware agent has to compute the expected contents. It is assumed in this example that the original contents—before the RAM-filling was performed—were zero. If this is not so, the effort of the malware agent would be greater, so making this assumption establishes a lower bound on the effort of the malware agent. To compute the expected updates to this cell that would have been performed by the RAM-filling algorithm, the malware agent needs to compute the values for all the rounds passes on the memory chunk in question. The values XORed in to memory come from a pseudo-random sequence. And, it is only possible to reconstitute the state of the chain in the cell where it is missing by computing the value next_string_chunk from a value that is stored by the malware agent in part of the c chunks of storage. It is assumed that the variables are stored solely in RAM, or the malware agent needs to also succeed with strategy 1 (outsource storage).

As explained above, the pseudo-random generator cannot be computed using a random-access approach. It is the case that L=16 chunks is needed to store a state, given a chunk size of 32 bits and a state size (=MD6 output size) of 512 bits. The malware agent has to recompute the sequence of hash function invocations from a position of RAM associated with this state (which does not have to be where the malware agent stored this state.)

Given the random permutation over cells during the writing of the memory (the order which cannot be anticipated by the malware agent), the expected length of the run to the string position corresponding to the stored state is at least rounds× n/(c/L), where n=number_blocks×chunks_per_block corresponds to the number of chunks that RAM consist of, rounds×n is the length of the pseudo-random string, and where c/L are the number of pseudo-random states stored by the malware agent. Thus, for each hit to a "bad" cell, the malware agent has to perform an expected rounds×n×L/c invocations of next_string_chunk, which corresponds to rounds×n×/c. There are c such hits, not counting hits to "bad" cells that occur as the malware agent attempts to compute one of the expected states. Therefore, the malware agent has to perform at least rounds×n hash operations to compute the contents of the c bad blocks from the stored contents. The approximate time to do this (according to an example implementation) is at least between 100,000-1,000,000 times slower than the legitimate client which indicates that any attempt to compute missing data will be detected.

If the computation of the chain causes the access to a cell that has been used to store a value for another pass of the computation, then this causes another hit to be incurred. It would happen with an approximate probability (c−c/rounds)/c×c/number_blocks=(c−c/number_blocks)/ number_blocks≈c/number_blocks for each memory access, and therefore, with approximate probability $1-(1-c/\text{number\_blocks})^{number\_blocks \cdot rounds^2/c}$ for a given first bad cell hit, as described above. A rough approximation of this quantity is $1-e^{-rounds^2}$. For rounds=2, this is more than 98% probability. This additional cost would increase with increasing values of c. An adversary would therefore do best to make c small.

In the following, assume that the adversary uses c=L=16 cells only, all 16 to store one value. With this configuration, the adversary would fail to compute the value (unless using external memory) in those situations where the chain leads in a direction that does not make it possible to compute the value corresponding to the "programcell" from the value in the "storage cell". For rounds=2, this failure occurs with probability 75%. In the remaining 25% of the cases, the adversary would simply be slowed down. (To always succeed to compute the value, the adversary needs to store at least round=2 values, each 512 bits long.

Defending Against Adversarial Strategy 3—Outsource Computation.

In some embodiments the time between checkpoints is chosen so that there is no time to outsource computation using the communications equipment on the device. The time between checkpoints can be chosen by verifier 106 in a way that makes this immediately detectable. A strategy involving outsourcing of computation will fail, as the roundtrip has to be completed between two checkpoints for the right value to be provided by the adversary. This is independent of the speed of communication between the client device and the verifying party.

Defending Against Adversarial Strategy 4—Modify Detection Code.

Suppose unauthorized program 508 corrupts the execution of some steps (e.g., as described in conjunction with FIG. 6), then willingly loads legitimate code and removes itself. Such an adversary could potentially corrupt portions 602 and 604 of the process, but will not be able to corrupt portion 606. Specifically, it needs to corrupt portion 602 of the process (clearing swap space and RAM) in order to maintain active. It can then cause a misreporting of state at 604. However, this will be detected when the keyed hash of the memory contents are computed (610). This is both due to the assumed collision-freeness of the hash function used, and the fact that the key is not disclosed to the device until 608. Portion 608 cannot be corrupted without being active during 606, which in turn would cause detection, as described above. And, the evasive program will be unable to compute the correct values to be reported at 612 without executing portion 606 of the process shown in FIG. 6.

Combinations of the four adversarial strategies will also fail, since each of them will be detected and combinations of them do not change the underlying device-specific limitations.

Additional Processing

Figure 8:
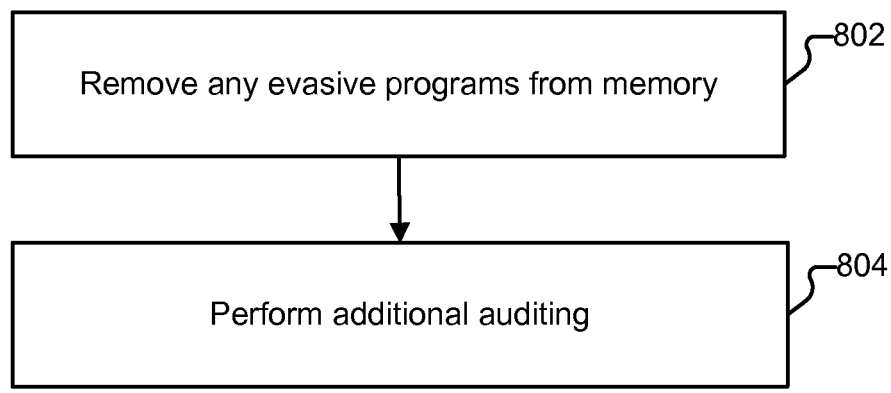
FIG. 8 illustrates an example of a process for performing a device audit.

FIG. 8 illustrates an example of a process for performing a device audit. In various embodiments, the auditing processes described above form one phase (802) of a two (or more) phase process. Once the techniques described above have been employed with respect to a device such as device 102, an assumption can be made that no evasive software is active in the RAM of the device. Arbitrary additional processing can then be performed on the device (804). Examples of additional processing that can be performed are described below.

Example

Malware

After the processing of 802 is performed, at 804, device 102 performs traditional antivirus software to identify known bad software, such as may be stored in memory 206. At 804 device 102 can also be configured to report the entire contents of memory 206 or portions of memory to verifier 106 or to another device.

Example

Jailbreaking

After the processing of 802 is performed, at 804 device 102 determines whether its operating system loader has a particular hash, and/or otherwise determines whether the operating system loader has been altered away from a desirable state.

Example

Phone Unlocking

After the processing of 802 is performed, at 804 device 102 determines whether its operating system loader has been altered and also determines whether any information associated with a service provider has been altered.

Example

Software Piracy

After the processing of 802 is performed, at 804 device 102 determines whether any software included in memory 206 has been modified from an expected configuration, ascertains any associated serial numbers for the software, and/or otherwise determines whether the included software is being used in an unauthorized/unlicensed manner. In some embodiments device 102 reports the contents of memory 206 or portions thereof to verifier 106.

Example

Media Piracy

Suppose that media files (e.g., music, video, or image files) are customized using watermarks during distribution, and that these watermarks are cryptographically authenticated, e.g., using a MAC or digital signature. At 804 it can be determined which files present on device 102 have legitimate watermarks, and whether these contain valid authenticators. The determination can be made either locally to device 102 or centrally (e.g., on verifier 106).

In various embodiments, applications (such as a music player installed on device 102) record usage and other data (forming a log of activity) and associate the information with the appropriate media (e.g., song file). The logs can be read by the verifier 106 at 804.

Example

Chains of Custody/Usage Logs

Suppose an application (or data file) has an associated log file that is used to record transactions. One example is a log file that records the occurrence of financial transactions, including stored-value information. The legitimacy of changes made to the log file can be verified as follows. First, the processing of 802 is performed. Then, at 804 a determination can made (e.g., by comparing hashes of program images) as to whether or not the application (or data file) has been altered, and thus, whether the log file is genuine.

One approach to the processing performed at 804 in this example is as follows: First, memory 206 is scanned and a list of applications and data files associated with the applications is created. Next, a list of descriptors for the applications and data files is determined. An example of a descriptor is a hash of the file, along with the name and type of file, and an identifier stating what string sequence(s) it matched. Next, a second list of any descriptions of applications or data that is not already reported on in the first list is made. The description created here may include all or parts of the code for an application, or of a description of what type of input files it processes and output files it produces. The second list is transmitted to an external party, such as verifier 106, where it is verified. The second list can also be processed locally using any policy obtained from a policy verification server.

The outcome of the verification can be used to affect the permissions to the applications and data, and can be used to control how external servers interact with the device, including whether it is granted access to network resources (such as the Internet, 3 G networks, corporate networks, etc.). As another example, the software allowed to run on the device can be restricted, and notify the user of lack of compliance, attempt to remove or repair or otherwise modify files, etc.

Example

Parental Control Filters and Other Monitoring Features

After the processing of 802 is performed, in various embodiments, additional middleware is installed that can be configured to log(and/or block) various events associated with the device. Examples include:

(a) determining what photos was generated on the device and later transmitted out (e.g., to prevent "sexting").

(b) determining (e.g., based on device activity and GPS changes) whether the device was used (e.g., for texting or watching video clips) while travelling at a speed greater than 20 miles per hour.

(c) determining (e.g., based on installation activity) whether alternative applications (such as a second instant messaging program in addition to a default program) has been installed, and then creating a log file for the alternative application.

(d) determining (e.g., based on browser history information) what URLs a user has visited including which URLs were manually navigated to and which URLs were referred to in other HTML documents that were accessed. One benefit of this logging is to identify whether a person is likely to have fallen victim to phishing; has visited a web site known to distribute unwanted content, including malware; and whether the device is likely to be involved in click-fraud. Such abuse is possible to achieve without infection of the device itself, e.g., by use of JavaScript, cascading style sheets, and/or other related scripting languages.

Example

Additional Applications

In addition to the above examples, yet more uses of the techniques described herein are possible. For example, device auditing can be used in vehicular black-boxes for metering usage, purposes of insurance, tariffs, taxes, tolls, etc.—both to identify malware and intentional tampering.

The device auditing technique can be included as a component in other applications, allowing these applications to temporarily suspend themselves to perform the scan, and later be given control again, in the known clean state.

As yet another example, the techniques can be used in medical devices, to determine that they are free from infection, correctly configured and maintained, and in order to audit usage in special cases when it becomes valuable to know who had access to data and equipment. The devices in question may log usage information at all time, in a way that preloaded application cannot interfere with; the audit process would include a memory-printing scan to assert that the preloaded applications are still in a good state, and that no conflicting applications or configurations are present.

Finally, the techniques can be used for detection of malware in situations where there is no need to remediate, or where that is not the primary goal. One such context is for online games, to detect the absence of modules to cheat in the games.

Preserving Privacy

In some embodiments descriptions of all state (e.g., the contents of memory 204) is communicated to the verifier 106. However, some data should preferably not be transferred off device 102, such as private keys and non-executable private data. In the following section, techniques preserving the privacy of such data are described.

Assume that a first random number is called x, and that it is selected from some space of possible values, $1 \ldots \max_x$. It is possible that x encodes malware apart from providing an input to the auditing process for which it was intended. A legitimate program computes a one-way function value y from the input data x and some system parameters, which is called $(g_1, n_1)$. One example way of doing this is by computing $y=g_1^x$ modulo $n_1$, where $g_1$ generates a large subgroup of $G_{n1}$.

Let the program then compute a second one-way function value z from the value y and some system parameters, which is called $(g_2, n_2)$. One example way of doing this is by computing $z=g_2^y$ modulo n2, where $g_2$ generates a large subgroup of $G_{n2}$.

Next, it is assumed that the client machine proves (e.g., using a zero-knowledge proof) that there is a value x such that $z=g_2^{g_1^x \, modulo \, n_1}$ modulo n2, where $(z, g_1, g_2, n_1, n_2)$ are known by the verifier, but $(z,x)$ are not. The device (the "prover") then erases the value x but stores $(y,z)$ and the parameters $(g_1, g_2, n_1, n_2)$.

At later times, the device has to prove that the value y that it stores, but which is secret, corresponds to the value z. (Here, z can be stored on device 102, but can also be stored by verifier 106.) One example proof that can be used is a zero-knowledge proof.

If the second proof concludes and verifier 106 accepts it, then the verifier knows that the unknown value z that the client stores is of a format that cannot be used to hide a significant amount of data of value to a malware agent.

Here, z can be used to encrypt some other data, which is referred to as m, and whose ciphertext is referred to as c. Thus, $c=E_z(m)$ for an encryption algorithm E. Assuming symmetric encryption, $m=D_z(c)$ for some decryption algorithm D. The device contents can be verified, but m remains unknown by the party receiving c. This party would not know z, but only that z is of some acceptable form that cannot hide large amounts of malware data. Since the auditing process described herein allows the verifier party to be assured that only legitimate programs exist in the RAM of the client device, it can be known that the programs—using the secret value z—can access m, given c. However, the verifier cannot.

Since it is known that the accessing program is legitimate, it is also known that m will only be accessed in an approved manner. For example, if m is data and not code, then it is the case that the accessing program will not try to execute the data.

Using a Pseudo Random String Generator

Figure 9:
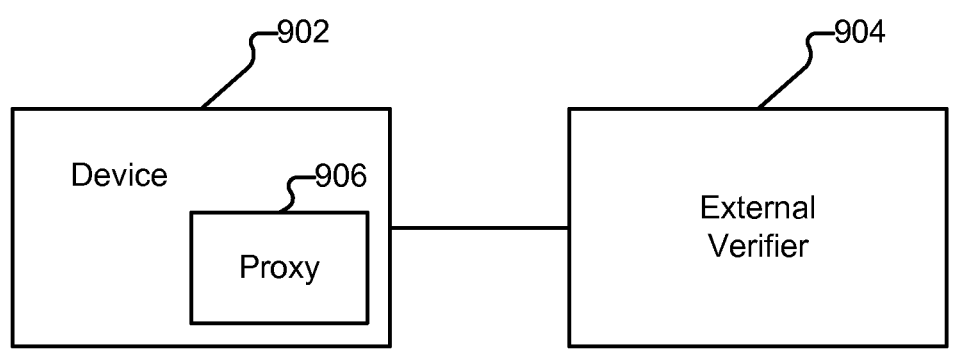
FIG. 9 illustrates an embodiment of an environment in which device auditing is provided.

FIG. 9 illustrates an embodiment of an environment in which device auditing is provided. In the example shown, device 902 includes, in addition to the components illustrated in FIG. 2, a SIM configured to serve as a proxy (906) for external verifier 904. As will be described in more detail below, a monolith kernel stored in the instruction cache of device 102 (where it fits in its entirety) swaps out all other processes (excepting any processes it chooses to except) when it is activated, and performs an auditing process. The monolith kernel has an associated working space that is located in the data cache (and registers). The cache is typically implemented using RAM, and is considered as being part of it herein. As used herein, "free RAM" is the portion of RAM which ought to be free after all applications—including the regular kernel—have been swapped out. In some embodiments, "free RAM" is defined as the segment of RAM that is not taken up by a set of approved routines and data. For example, the regular kernel may be an approved routine, as may common and whitelisted applications. Moreover, approved data may correspond to data that is known by the external verifier, and may be of any format, as long as it is whitelisted (i.e., believed to be safe.). In such cases, the approved programs need not be swapped out to secondary storage (as described in more detail below) but may instead remain resident during the memory reading portion of the audit (e.g., 1108).

In some embodiments the monolith kernel corresponds to a program $F_\epsilon$, parameterized for a known execution environment $\epsilon$. As explained above, the execution environment corresponds to a hardware configuration of the device. Executing $F_\epsilon$ on input x produces a sequence of outputs $F_{\epsilon i}(F_\epsilon, x)$, each within a time $t_i$ ($F_\epsilon$, x) from the start of the execution and produces an ending state $s(F_\epsilon,x)$. In this example, $x \in X$, where X is the set of all legitimate inputs.

Proxy 906 is used to reduce latency variance from the device, and in various embodiments is implemented as a tethered cellular phone, a cell phone tower, etc., instead of or in addition to a SIM. In some embodiments external verifier 904 performs an initial computation (described in more detail below) and communicates (e.g., via a secure channel), part of the information to proxy 906, using device 902 as an intermediary. Proxy 906 times computations performed by the monolith kernel and reports the timing measures back to external verifier 904. In some embodiments, external devices, such as tethered cell phones or computers, base stations, or additional external verifiers are used instead of or in addition to proxy 906. It is also possible to use software proxies that are believed to be tamper resistant, or to use special-purpose hardware proxies.

Figure 10:
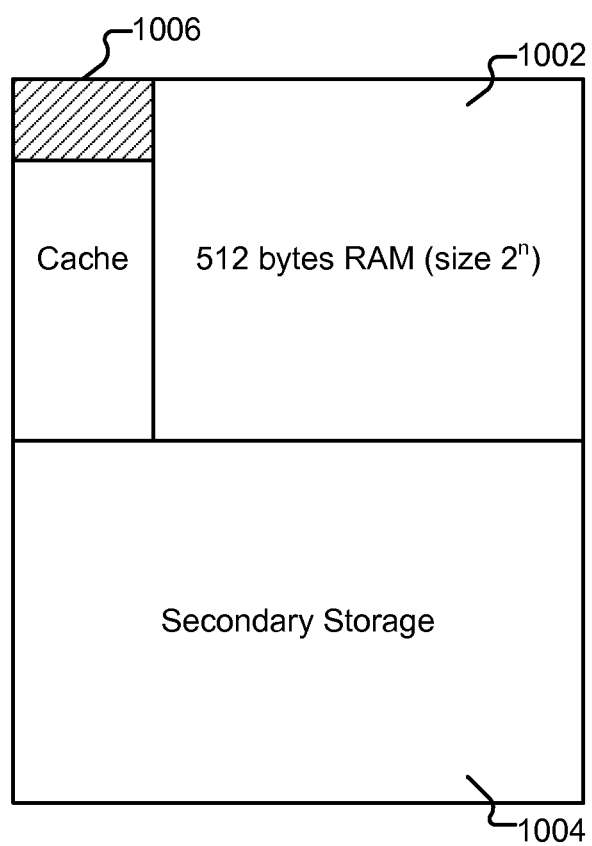
FIG. 10 illustrates an embodiment of a portion of a device.

FIG. 10 illustrates an embodiment of a portion of a device. As mentioned above, "free" RAM is defined as being the portion of RAM that ought to be free after all applications and the standard kernel have been swapped out. The width of the bus is a word. The size of memory is also describable in words. For example, a 512 byte memory page as shown in FIG. 10 has a size 128 words on a standard handset, where a word is 32 bits. As used herein, a "chunk" is the length of the cache line. In the example shown, the cache line corresponds to 8 words, each of which is 32 bits, and the chunk is 256 bits accordingly.

Figure 11:
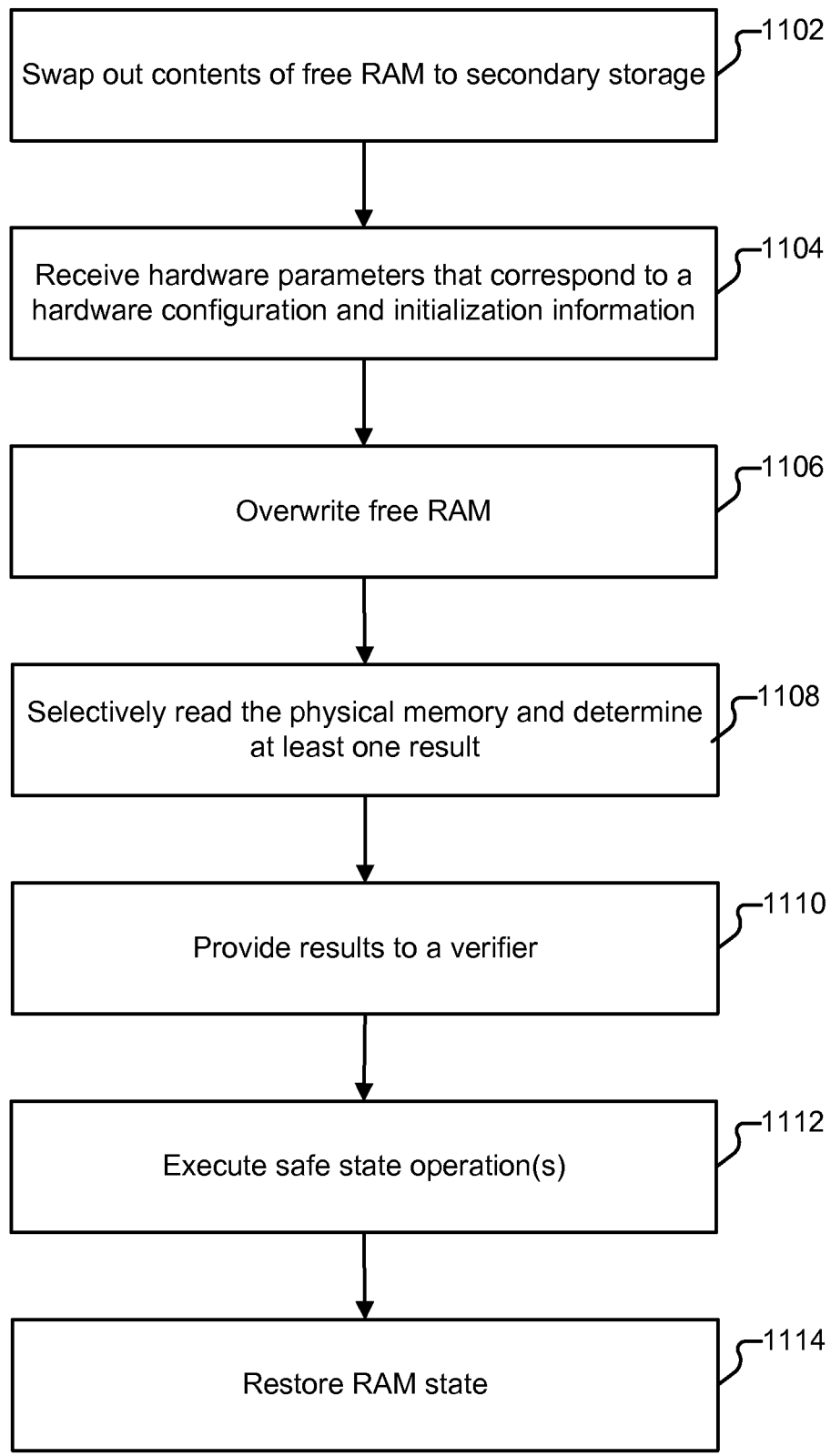
FIG. 11 illustrates an embodiment of a process for performing a device audit.

FIG. 11 illustrates an embodiment of a process for performing a device audit. In various embodiments, the process shown in FIG. 11 is performed by device 902. The process is configured such that its computations are expected to complete in a particular amount of time. Any change to the amount of free RAM evaluated and any attempts to access secondary storage 1004 will result in an observable lengthening of the amount of time the computations take to complete. Similarly, changing the contents of any of the whitelisted programs or associated data will cause a delay or the computation of the incorrect responses.

The process shown in FIG. 11 can be initiated in a variety of ways, such as the ways described in conjunction with the process shown in FIG. 3. As additional examples, the audit process can be included in a shutdown or boot route. It is also possible for an application to initiate the audit process. The application would be deactivated, the processing would be performed, and control would be handed back to the application when complete. In some embodiments an application queries a central authority (or the device) for information about how recent the last scan was performed. The SIM card can store information about when a scan was performed. If the SIM card has the functionality that allows it to constantly measure time, it can give an actual time as the answer. Otherwise, it can give a time estimate based on the number of seen transactions, many of which will be known to be periodic. Such information can be used to assess the duration since the last scan.

The process begins at 1102 when contents of memory 1002, except monolith kernel 1006 (and any processes it deems acceptable to retain) are swapped to secondary storage 1004. In some embodiments portion 1102 of the process includes swapping out the normal kernel, or parts thereof. Crucial features, such as device drivers for serial communication, are re-implemented in monolith kernel 1106. In various embodiments, the contents are swapped out verbatim, or compact descriptions of the contents are swapped out or stored on the proxy, external verifier, or other trusted device, or stored in RAM in a state that cannot be used for active code. (E.g., it is possible to store instructions in a portion of cache not intended for instructions, but only data.) In some embodiments, no "free" space exists and portion 1102 of the process shown in FIG. 11 is omitted.

At 1104, one or more hardware parameters that correspond to a hardware configuration are received. This portion of the process is similar to portion 302 of the process shown in FIG. 3. Also at 1104, initialization information, such as a seed that can be used to generate a pseudo-random string, is received. Other examples of initialization information include a step value and a key value, as described in more detail below.

At 1106, the free RAM is overwritten. In some embodiments the output of a pseudorandom string generated using the seed is used to overwrite the free RAM. One technique for overwriting the free RAM is to generate an $n^2$-bit pseudorandom string with the particular property that the computation of any one of the output bits will take at least half as long as the computation of the entire block of bits or at least 512 applications of MD6 in 512 bit mode. The technique uses three phases, and repeats (with different values of aux) until the output strings fill the entire free RAM:

1. Generating: Using a hash function h (e.g., MD6) with an output size of "n" bits, generate the value $x_i = h(\text{seed}, i, \text{aux})$ for $0 \le i \le n-1$, and some value aux. This generates $n^2$ pseudorandom bits.

2. Shuffling: Compute $y_j = \Pi_{i=0} 2^i \text{BIT}_j(x_i)$, $0 \le j \le n-1$, where $\text{BIT}_j$ is a function that returns the $j_{th}$ most significant bit of the input. This shuffles the bits in a manner that requires computation of all n hash function applications to reconstitute any one of the values.

3. Blending: Compute $z_j = h(y_j)$, for $0 \le j \le n-1$. This assures that each bit of the output is a function of all the n input bits, each one of which required one hash function evaluation to compute.

In various embodiments, additional shuffling and blending is performed to further increase the cost of computing any part of the final string. In addition, other techniques for overwriting free RAM can be used instead of the example technique described in conjunction with portion 1106 of the process shown in FIG. 11.

At 1108, memory 1002 (or portions thereof) is read in a manner determined by the "step" value. Results are accumulated and the computation is keyed using a key. In various embodiments, the processing of portion 1108 is performed by a memory access scheduler and an accumulator, each of which will now be described in more detail.

Memory Access Scheduler

Let "sRAM" be the size of RAM 1002, measured in its entirety, in chunks. External verifier 904 will select a random value step in the range page<step<sRAM−page, such that "step" is an odd value. Here, "page" denotes the size of one memory page in secondary storage, also measured in chunks. In the case where there are several page sizes (e.g., if there are several components that constitute secondary storage), in various embodiments the largest of the page sizes is used.

Figure 12:
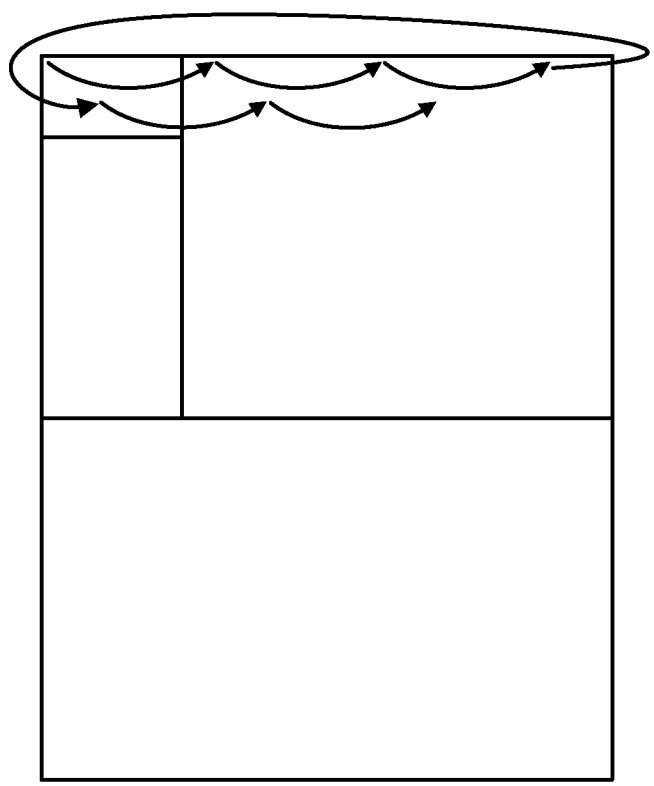
FIG. 12 illustrates a portion of memory being read in accordance with a step.

Performing the processing of 1108 includes a loop in which memory is accessed and the results combined to form a keyed memory checksum. For each iteration of the loop, the access location is increased by the value step, modulo sRAM. Because "step" and sRAM are relatively prime, all RAM memory locations will be accessed exactly once. Further, the access order will be unknown to an adversary until the value "step" is disclosed. An illustration of memory 1002 being read in accordance with a "step" is provided in FIG. 12.

In the example shown in FIG. 9, device 902 includes a single, single-core CPU. In systems such as laptop computers that include multi-core processors and/or multiple processors, the processing of 1108 can be constructed in a way that is either inherently serial (and which will therefore obstruct the use of multiple processors) or adapted to take advantage of multiple processors. As one example of the latter, several computations can be started with offsets such that each thread corresponds to a different portion of memory, and where there are no collisions.

Accumulator

Memory contents can be accumulated in a register using a simple non-linear function that combines the previous register contents (referred to herein as a "state") with the newly read memory contents (data), one by one. Examples of accumulating functions include hash functions (e.g., MD6); a non-linear shift-back register; and simpler functions.

On example of a simpler function is state←ROR(state+data). The latter function corresponds to a function ROR( . . . (ROR(state$_0$+data$_1$)+data$_2$) . . . +data$_n$), where "+" refers to regular addition, and "ROR" rotates the contents of the register one bit to the right. In this case, the function itself may not be nonlinear, but when combined with the a priori unknown step size and the tight timing requirements, it is nonetheless sufficient to satisfy the processing requirements needed.

Is mentioned above, in various embodiments, the accumulation process is keyed. One way to accomplish this is to offset the value "state" with a new value "key" (obtained from the external verifier or the proxy) at regular intervals. The offset can be performed by adding the current value state to the new value key.

Further, while the process described in conjunction with 1108 is based on reading memory, in some embodiments a write operation is included to cause further flash-based slowdowns. As one example, sequences of "1"s are written, as causing an erase of the entire block, should the data be stored in flash. To simplify the scheduling of where to write (and with it the monolith kernel), the location can be obtained from the proxy at the same time a new key value is obtained.

Various other sequences of memory accesses can also be performed at 1108. For example, it is possible to use two step values instead of one, where these step values may both be even numbers, but where they cause mostly all of the space to be covered. It is also possible to use a collection of numbers or parameters that determine a function that selects the sequence of locations. It is possible to think of this as a maximum-length sequence, where the outputs are locations, and the maximum-length sequence includes all values in a given range, corresponding to memory positions. It is possible to offset such values to avoid accessing certain areas (e.g., the monolith kernel), should that be desirable. In the case of a maximum-length sequence, the key provided by the external verifier or proxy can be the initial state, or the weights associated with the various cells of the LFSR.

At 1110, the keyed computation is provided to an external verifier 904. If the external verifier approves of the results, device 902 is deemed to be in a safe state.

At 1112, device 902 executes any functions that are to be executed in a safe state. Examples include setting up an SSL connection, casting a vote, entering a password, scanning secondary storage for malicious/unwanted programs, etc. In various embodiments, if the code of the safe-state function is in secondary storage (i.e. it is not part of the monolith kernel), a digest of the function is compared to a value stored in the monolith kernel (or on the proxy). The function is activated only if the values match. In various embodiments, if the proxy can perform the message digest computation, the monolith kernel need not contain code to do the same.

At 1114, the state of RAM 1002 is restored by loading contents (swapped out at 1102) of secondary storage 1004.

A large portion of the potential load of the process shown in FIG. 11 involves swapping out applications and data from RAM to secondary storage, and swapping it back. It is possible to avoid doing this, e.g., in order to save time. This could be done by killing the applications. If an external verifier or other resource knows what applications are running, and potentially also their state or parts thereof, it is possible for this party to assist in restarting selected applications after the auditing process has run. It is possible for secondary storage or a SIM card or other on-board unit to maintain some of this information. It is possible to identify applications and data not by their full strings, but by shorter identifiers to save space and time. It is possible to have approximate algorithms that largely re-generate the same state after the detection algorithm has run. For example, this may restart a browser, but fail to recover the browser contents.

Further, it is not necessary to swap out active applications if they only take up some portion of RAM. For example, suppose they only take up the lower half of RAM. For each cell (number i) in free RAM, copy the contents of that cell to a position higher up (position 2i). This is preferably done starting from the end (higher numbered positions.) This effectively slices the applications, and makes them reside only in even positions. Now pseudorandom values need only bet written into the odd-numbered positions, and only need to perform the nonlinear accumulation of the odd-numbered cells. Note that it is not possible for any functional malware to remain active. It is possible for malware to exist, but only if its instructions are "jump to next open space" and that is where the next instruction is. Since all the space that is not overwritten by pseudorandom material will be jumps only (there is not space for more in consecutive space), it is knowable that the malware cannot achieve anything. It is possible to make the distance between slices larger, especially if the space is not predictable by an adversary. The distance may be predicted by a sequence generator, for example, where different distances are different length. The spreading out of data and programs within the RAM can be combined with offsetting these with random strings. The microkernel (the program in charge of the malware detection)—would not be spread out in this manner, as it needs to remain in a state that allows it to execute.

In conjunction with FIG. 11, a description was made as to how RAM could be read using a step size that is not a priori known. It is also possible to write (free) RAM using a step size other than one, where the step size may be unknown a priori. One effect of this is that it causes writes to secondary storage for an attacker wishing to store information in secondary storage. These delays are greater than read delays if secondary storage uses flash. It is possible to use a simple step increment modulo an integer corresponding to the range to be written—plus an offset if the monolith kernel does not reside in high addresses. It is also possible to use no particular modulo for the arithmetic—which corresponds to using a modulo corresponding to the addressable RAM space—and to identify whether the cell to be written is in a range that should not be written.

FIG. 13 illustrates an embodiment of an implementation of a process for selectively reading memory. In some embodiments FIG. 13 is used to implement a portion of portion 1108 of the process shown in FIG. 11.

In some embodiments, full use of the data cache is made. Specifically, data is processed in chunks the width of the cache line, whose size typically ranges from 8 to 512 bytes. In the following, the parameter "α" denotes the width of the cache line, in words. The parameter "period" corresponds to the length of the timing periods. This is set to correspond to a time that is shorter than an optimistic roundtrip latency from device 902 to a potential external helper. The reported values, and the time at which they are reported, are recorded by proxy 906.

Examples of Detecting Various Evasive Programs

The following section provides examples of how evasive programs employing the various strategies described above can be detected using the techniques described herein. To succeed in evading detection, an adversary has to provide the correct responses $F_{\epsilon,i}(x)$ within the expected time $t_i(F_\epsilon,x)+\delta$. There are various ways this can be attempted by an adversary, each of which will now be described.

Defending Against Adversarial Strategy 1—External Support.

The values "key" and "step" are communicated to the proxy over a secure channel. The value of "state" is reported for each iteration of the outer loop. The computation of this value depends on the value "key." Therefore, it is not possible for an external device to help with the generation of the responses if the roundtrip latency (from sending out the value key to receiving the result of the computation) exceeds the time threshold $t_i(F_\epsilon, x)+\delta$, where $t_i(F_\epsilon,x)$ is the time for $F_\epsilon$ to generate the response.

Defending Against Adversarial Strategy 2—Using Secondary Storage.

Assume that the adversary has modified some "k" words of data in RAM, and that an image of the "intended" contents of this area is kept in secondary storage. When $F_\epsilon$ would have attempted to access one of the modified cells, F' instead accesses the image in secondary storage.

This can be done in three ways: (a) The entire RAM can be imaged in secondary storage, and each access is made there; (b) Each memory access of $F_\epsilon$ is replaced with a comparison of the address to a range, with select access attempts only being rerouted to secondary storage; and (c) the Translation Lookaside Buffer (TLB) is used to automatically reroute accesses with selected ranges.

In the first case, each memory access will suffer the delay associated with accessing secondary storage instead of RAM. In the second case, only rerouted accesses suffer this delay, but for each memory access, a comparison has to be made. In the third case, there is only a delay imposed for rerouted accesses. However, due to the somewhat coarse granularity of the TLB, there is a minimum number of cells for which accesses can be rerouted.

Defending Against Adversarial Strategy 3—Using Ram.

Due to the construction of the pseudorandom string that is used to fill free RAM, computing any one cell will require the computation of at least 512 hash function evaluations, since the value in each cell (in some embodiments) is a portion of the second-layer hash function output, whose input is a function of 512 first-level hash function evaluations.

Suppose there is a setup cost for each hash function computation, and that this is at least 1156 clock cycles. At the same time, the hash computation for MD6-512—once the setup is completed—takes 155 cycles per byte, or 9920 cycles for a 64 bit input. Both of these assume optimized code and for a typical 32 bit processor. The total cost per hash function evaluation in this setting is therefore 11076 cycles. Computation of the contents of only one cell in RAM will take at least (512+1)*11076 cycles.

Using Proxies for Timing

As mentioned above, in some embodiments an external verifier is used to distribute new seeds and to time the arrival of values from timing checkpoints. To example models of communication between the audited device and the external verifier are: (a) a physical connection; and (b) a VPN between the external verifier and a SIM card. Data down is encrypted, data up is authenticated and/or bi-directional authentication occurs.

When a physical connection is not used between the device and the verifier, variances in latency can frustrate the timing of the computation. Accordingly, in some embodiments a proxy (with less latency variance) is used to support the timing. One example piece of hardware that can be used as a proxy is a SIM card.

A proxy can be used to reduce the variance associated with the starting of the computation. This applies both to the entire computational task, and to subtasks. Both of these can be initiated by sending a key or a seed that is needed for the computation, guaranteeing that the computation does not start until the key or seed is received.

The SIM card receives encrypted seeds, decrypts them, and provides device 902 with the values. This dispensal time can be made relative to other events that are observed on the device. Consider a triplet (location,data,seed), and assume the verifier produces such triplets, and sends them in an encrypted and authenticated fashion to the SIM card. Here, location describes a computational step (or stage) within a program, and data describes some state associated with this location. Assume that the computation can be anticipated by the external verifier, or that a small number of very likely computational paths can be anticipated.

This makes it possible for the external verifier to compute these triplets, predicting what data (or state) will be observable on the device at a given location (or stage). The third element of the triple, seed, denotes the value to be dispensed to the device if it reaches a given state, associated with location and data.

The SIM card will send the "value" location to the device, unless it can be computed or predicted by the device, or received from elsewhere. When the computation has reached a stage associated with the value location (this can be a loop iteration value), the software on the device sends the most recently computed value of some predetermined type—or parts thereof—to the SIM card. This can be the most recently computed value, the contents of a given register, or any other appropriate value. The SIM card compares this value to the value data associated with location, and if they are the same or equivalent, then responds with the value seed. The device replaces its current seed value with this new value for seed. This allows the device to replace the seed at a time when it has computed some value that vouches for it having reached a given computational stage. The new seed is not disclosed before this, which has security benefits. Alternatively, new seeds can be disclosed as soon as a new result is reported, independently of whether this reported value was correct or not; any reported value would be recorded, along with when it was received, allowing a verifier later to determine if incorrect results were received, or whether there were any noteworthy delays. The reports sent by the proxy can be compressed or digested in order to save bandwidth, as applicable.

The computation has reached a given checkpoint associated with a triple (location, data, seed) once a match is made and the associated seed value is dispensed.

In some embodiments the SIM card has a long vector of such triples, and selects either the first one (in the case of straight computation) in the line, or any one that matches the input (in the case where there are branches not foreseeable by the external verifier unit). It is possible to leave out the value location if a predictable location is used. The SIM card can obtain a long list of triples without it being possible for any of these to be intercepted by the handset or other parties; this is made possible by the use of point-to-point encryption between the external verifier (or associated proxy) and the SIM card.

It is also possible to use a verifier-initiated event instead of the value data. Thus, once that event is observed by the SIM card, the associated value seed is released, and the device computation is started with this value. This can be used to start the clocking. This can also be implemented by the device having to present a given piece of data that may, for example, be delivered by the external verifier to the handset in order to start the computation.

It is possible that some of the seed values are empty, in which case no seed value is sent to the device. This could be used to perform a check as to what point of the communication the handset has reached.

The SIM card does not have to be clocked (and therefore be aware of time), and it can operate in a hostile environment (as long as the values "data" are sufficiently long to preclude exhaustive search by malicious code on the handset, with the goal of obtaining seed values in a premature manner.

The end of a computation can be identified by having a checkpoint, as above, after which the SIM card reports the time of the computation to the external verifier, or reports information which allows the external verifier to compute an estimate of the time between the beginning and end of the computation. In the former case, a collection of local time values can be recorded by the SIM card, one for each checkpoint that is reached. This can be recorded as a list of pairs (location, time), where the value time can be a local time that does not need to be synchronized with the external verifier's notion of time. Alternatively, pairs of reported values and the associated times can be recorded. The SIM card can authenticate this list and transmit it to the external verifier, who would verify that the authentication was correct, after which it can make a determination of how long various computational tasks took. This can be used to infer the device's security posture. Alternatively, the SIM card can make this security determination and send an authenticated result of the determination to the external verifier.

Even without the ability to tell time, the SIM card can order events. As it receives packets from the verifier (or any entity collaborating with the verifier, and not with the malware), it will determine what device-reported event most recently took place. This corresponds to a value "data" that was received and verified as being correct. Thus, the values data can be generated by the device (given some computational task set up by or known by the external verifier) or can be a result of communication from the external verifier.

To deal with intentionally delayed reporting to the SIM card, it is possible to require immediate acknowledgment by the SIM card to the external verifier, once an event packet is received. These messages are authenticated and/or have a format that cannot be anticipated by a malware agent. An example way to construct this by letting the value "data" above correspond to the event from the external verifier, and let the device report the associated value "seed" to the external verifier once it is received from the SIM card. The external verifier can then time the arrival of this acknowledgment after a preceding packet is sent. Alternatively, the device can be allowed to report values corresponding to "data" directly to the external verifier. This can be done for some portion of all the checkpoints, or for additional checkpoints.

Assume that a packet identified by a string S was received by the SIM card after an event E took place, but before any other event took place (and was correctly verified by the SIM card). Then, the pair (S,E) is added to a log L. Alternatively, identifying portions of the strings S and E are added to the log. The log is communicated to the verifier at the end of the communication. Alternatively, ordering information is communicated to the external verifier.

In some embodiments, triplets (location,data,report) are added to the vector, where "report" is a value that signifies a report being sent to the verifier. This can also be achieved using regular seed values, where the last seed value released is a value that the device communicates to the verifier in order to stop the timing. The timing can also be stopped by having the device perform some additional keyed task and report back values in exchange for seeds, in which case the arrival of the next packet with a string S would identify when the timing stopped (extrapolated from the number of cycles that apparently were computed after the intended computation ended.)

Once the timing has ended, the SIM card encrypts (and potentially authenticates) the log, and passes this to the device for transmission to the verifier. The verifier determines whether it was correctly authenticated, decrypts it, and then determines from the log what the completion times of partial steps of the communication were, given information about the transmission times of the packets containing values such as S. It may know the times when these were transmitted by the base station closest to the handset, or may know when they were processed by a network proxy, or by the originator of the packet itself.

In some embodiments the values S are generated by a trusted beacon and potentially not known by the external verifier by the time it starts the computation on the device.

Some types of packets, like the packets containing S, need not be encrypted before they are transmitted over the network. In some embodiments they are authenticated. However, the verification by the SIM card of whether a packet has a correct authentication need not be done before a preliminary log entry is compiled. If the authentication verification fails for an already compiled log entry, this log entry can be erased.

SIM cards are half duplexed, i.e., cannot receive and send data at same time. SIM cards operate as slaves, i.e., will only (with some special exceptions, such as when they are powered up) send data to the attached device (our handset) after having been requested to do so. However, some smart cards can operate independently between queries from their associated handsets, and not only as a reaction to being queried.

If a SIM card supports multi-threading, it is possible to let one thread perform a simple count (started when the timing starts), and to provide this counter to the other thread, which records this value each time a correct data value is received. The counter can be stored along with the data value, the associated location, or an index that indicates what data value is associated with the counter. In some situations, such as if it is guaranteed that one data value cannot be accepted more than once, and there is a deterministic order of values to be received, then we may record the counter values, and not the data values or other state information.

Some SIM cards, such as typical Java Cards, only support computation after a message is received from the SIM card interfacing device (CAD). The computation typically ends when the response from the SIM card is generated and transmitted to the CAD.

If a SIM card allows a counter to be increased for each clock cycle (or another deterministic periodicity) even before messages received from the handset, and after responses being transmitted, then it is possible to maintain the proper count, even without support for multi-threading.

It is possible to keep time-based state in the SIM card; it is also possible for the SIM card to authenticate events (including the time at which they took place) and export lists of such authenticated events.

FIG. 14 illustrates an embodiment of an implementation of a process for timing a portion of a device audit. In the example shown, a modified Java Card is used as a proxy. The modification permits the process to remain active after responding to a request. The proxy receives a vector of values input and output from the external verifier, and produces a vector duration that is transmitted to the external verifier at the completion of the execution. (All the communication between the proxy and the external verifier is assumed to be authenticated and encrypted.) In the example shown, the value "∞" corresponds to an error message indicative of an attempt of a malware agent on the client to cheat. Upon receipt, the external verifier will determine if the values in the vector duration all fall within the tight bounds suggesting successful completion, and will conclude that the client is in a safe state only if that holds.

Additional Ways of Using Proxies for Timing

In addition to using a SIM or similar piece of hardware as a proxy, it is also possible to use as a proxy another device that is believed to be in a secure state. It is possible to bootstrap security by first having one device (such as a phone) be verified as being secure, and then use that device to perform local timing and other verification tasks in the process of verifying the security of a second device.

The devices can be of different types. For example, one may use a SIM card, local cell phone tower, or a local computer to assist the security verification of a handset, on the request of an external verifier. It is possible for this external verifier to have prepared parts of the data used in the verification, such as the pairs of (data,seed) described above. It is also possible for a third party to perform this pre-computation. In various embodiments, a seed is generated by the proxy. One example is for the proxy and the device to both contain a sensor such as an accelerometer or photovoltaic sensor. Both the device and the proxy observe the same phenomenon (e.g., by being held together and shaken together) and calculate a seed the manner. In this case, the device uses the observed seed, and the proxy sends the seed (which it independently experienced) to the external verifier.

As soon as a first device is determined to be in a secure state, it can be used to time or otherwise assist in the security assessment of a second device, such as the infotainment system of a car, another handset, a netbook, a laptop or desktop, or other device. This security assessment can be of the same type (e.g., based on the time to perform computational tasks), or it can be an alternative security assessment method that is bootstrapped on the first. Likewise, the first security assessment can be of a different type, while later security assessment can be bootstrapped on the first one, and may use our timing-based approach.

In some embodiments, a first known "safe" device is used to produce a collection of sets of seed values, to be consumed by other devices at a later point. It is possible to have such sets certified (e.g., using a PKI or by peer-based authentication of values). Further, it is possible for the external verifier to operate in an off-line manner if it has the support of an online proxy. For example, the external verifier can send encrypted and authenticated data at a time far ahead of the auditing process; several such transcripts can be sent at a time. They can either be sent to the proxy, where they can be kept; or they can be sent to the audited device, or a proxy thereof, where they would be kept until needed. The transcripts that are generated by the proxy as a result of the memory-printing may also be buffered by a device and later sent to the external verifier, whether when they are requested, or when there is an availability of a communication channel. In some embodiments all records are marked up with time-stamps and serial numbers before they are authenticated and possibly encrypted.

It is possible to implement this in a network of small nodes, wherein some of the nodes either are trusted a priori, or are assessed to be secure; after which these nodes are used to assist the security assessment of other nodes. This is a potentially recursive approach, and can be circular, i.e., a previous trusted device used to assess the security of other devices may later on be verified by some of these devices, or devices assessed to be secure in other ways. The external verifier can still be included in the environment, and may help start up the chain of verification events, and help schedule what nodes should be verified when, and by whom.

Using Compressed Access Tables

In some embodiments the position of a memory access is determined by the contents of a vector "location" whose contents correspond to a permutation of all cells of free RAM. This vector can take up all of free RAM, if kept there. In some embodiments it is stored in secondary storage (such as flash), and portions are swapped in as needed. An alternative approach that maintains a pseudorandom access order, but which minimizes the computational effort during the main loop will now be described.

Consider two vectors, locationH and locationL, where both are vectors, each one containing a permutation of partial memory access positions. Here, the actual memory access position is the combination of two partial positions, e.g., the bits of one locationH element concatenated with the bits of one locationL element. Here, the locationH element is assumed to contain the higher order bits and the locationL element the lower order bits. These elements can be of the same or different size, but will, when combined, be the size that addresses one memory location. If each contains all possible elements in the range, then the collection of all combinations will correspond to a collection of all memory addresses. (From this, one can remove those that are not in free RAM by comparing the combined result to a threshold, and trash the result if it falls below this threshold.) This representation takes only the square root of the size of the space addressed to store. It is possible to use three components, in which case they take the third root of the space addressed. It is possible to use a large number of components as well. One example combination function is concatenation.

In some embodiments the order of access of the elements of the vector follows a geometric pattern that guarantees that all combinations are going to be used with an overwhelming likelihood. It can be beneficial not to have several accesses of one and the same item within one vector, as this reduces the degree of unpredictability to an adversary, given the increased patterns in memory access. It is possible to cover one combination more than once, although it is beneficial to limit the total number of accesses to memory at the same time as guaranteeing that all accesses are made, but for a negligible probability.

It is possible to access the locationH vector at a position x and the locationL vector at a position y, and to access the x-y positions along the diagonals. Here, the first sequence can be started at position (x,y)=(0,0), after which x and y are both and simultaneously increased by one for each iteration of the loop. When one coordinate is increased beyond the size of the vector, the coordinate is set to 0 again. Then, when the position again becomes (0,0), it can be to modified to start at position (x,y)=(1,0), after which the sequence of increments is repeated until it comes back to (1,0), at which time it is changed to (2,0). This is not the location of the memory access: it is the position in the vectors that describe where to make memory accesses.

It is also possible to otherwise compress the description of what cells to access by having a vector of locations elements, where each such location only describes part of an address, and the remaining bits of the address are computed in another fashion, or inferred from program state at the time of the computation. Moreover, these two approaches can be combined, and combined with yet other related descriptions of access locations that are at least partially pregenerated.

Additional Information on Timing

In various computations, timing of computation, and partial computation occurs as follows. (A) The timer is started once the auditor is provided with all necessary values, whether from the external verifier or a proxy thereof. These values typically include the value seed. (B) The timer is stopped (and the time since it was started recorded) when the auditor submits a correct value "state" to the external verifier or a proxy thereof.

It is possible to immediately start a new time interval when an old one has ended (where the start is signified by step A and the end is signified by step B above). It is also possible to implement "recesses" between these intervals; during these recesses, the computation may not be timed, and the algorithm may perform routine maintenance, such as communicating with external parties, reading or writing to secondary storage, or other functionality. The recess can be ended when the algorithm requests that the next timing interval is started (e.g. step A); one way this can be done is by signaling to the external verifier or proxy thereof to start the next interval; or it can be done by the external verifier or proxy thereof selecting to start the new interval.

It is also possible to implement recesses as standard timing intervals, whose length is not critical to the final determination of the security posture of the audited device.

Pseudorandom Access

In some embodiments, the selective reading performed as part of the audit process is accomplished through access in a pseudo-random order, with a sequence of reads and writes to the accessed positions. An alternate embodiment using pseudorandom access now be described. First, a description of an example of memory filling will be provided. Then a description of an example of periodic timing will be provided.

Filling Fast Memory

The following memory-printing function can be used to fill free RAM. It can also be used to fill other types of fast memory, in the event that such other types of memory are comparable with RAM in terms of access times. A pseudo-random sequence is XORed in to free RAM in a pseudo-random order; later, a keyed hash of the entire contents of RAM is computed. Even though RAM does not use blocks and pages, it can nonetheless be divided into "virtual" blocks and pages, corresponding to those of flash. Consecutive chunks of flash are not accessed in a page or block. This makes the access slow in flash, but still fast in RAM.

In order to fill free RAM with a pseudo-random string, there are two main steps. First, a setup function is run. This determines the random order of memory accesses to be made by the memory-printing function, using a seed obtained from the verifier to generate pseudorandom values. The table is stored in flash, and the program space used by the setup function is cleared after the setup completes. Second, a memory-printing function is used to fill all free RAM. Its execution is timed, both from beginning to end and in shorter intervals.

Handling Network Delays

Delays caused by infection can be measured from a device connected to the client device by internal wiring; standard network port, such as USB; over a wired interface; over a WiFi network; over a LAN; over the Internet; over a packet-switched network; over a communication network; or a combination of these. Some of these communication media may introduce delays and variance, which can be separated from the measurement using statistical methods.

The verification is made by a device that is connected to the audited device using a cable, a LAN, a WAN, Bluetooth, Wifi, the Internet, another network, or a combination of networks. The verification is made by comparing a received result with a computed result, and to verify that it (and the sequence before it) was received within the proper time bounds. All of these communication media may incur latencies, and some may drop packets.

Assume for a moment that a "good" event takes 10 units of time, plus between 1 and 5 (for typical network variance).

Then, assume that a "bad" event takes 15 units of time, plus 1 to 5 for network variance.

Consider the receipt of partial results at these times:

Sequence a: 0, 12, 25, (missing packet), 50—this sequence is likely to be good, in spite of the missing packet, since the last partial result "vouches for" the lost packet.

Sequence b: 0, 11, 30, 35, 50—this sequence is likely to be good, in spite of the long delay between the second and third packet, since the fourth packet was received "too early".

Sequence c: 0, 11, 30, 45, 57—this sequence is likely to be bad due to the long delay after the second packet, and no event that explains the delay.

Generation of a Pseudo-Random String

Example 1

In some embodiments, only half as much pseudo-random material is generated (as before). Only in even-numbered cells of free RAM is it written and only in these cells will memory-printing be performed later on. This speeds up both the generation phase and the memory-printing by a factor 2. It also avoids having to page out material in RAM, and allows the odd-numbered cells to be used to store temporary values, such as variables needed for the execution of the memory-printing. Malware can exist, but can only jump (to odd cells), nothing else. If it attempts to do anything else, it will have to execute random content stored in the even-numbered cells, which will disrupt the malware execution.

Example 2

(a) Obtain the seed to generate the pseudo-random string very early on, and generate this in the background . . . at any time. Call this first pseudo-random generator PRG1. Store this string in secondary storage until it is needed.

(b) To perform the setup before memory-printing, receive a new seed value (call this seed2) and use this as input to a fast pseudo-random generator. Call this second pseudo-random generator PRG2. Combine the output of PRG1 and PRG2 by XORing them together, writing the contents to free RAM. (Note that this can be combined with Example #1.)

Note: It is possible to use a weak PRG2, since the final randomness will be the combination of the two randomness sources. It can be also be one in accordance with NIST special publication 800-90. A secure block cipher can be converted into a CSPRNG by running it in counter mode. This is done by choosing a random key and encrypting a zero, then encrypting a 1, then encrypting a 2, etc. The counter can also be started at an arbitrary number other than zero. The period will be 2n for an n-bit block cipher. The initial values (i.e., key and plaintext) must not become known to an attacker. One example of a practical PRNG includes the Yarrow algorithm, which attempts to evaluate the entropic quality of its inputs, and an updated version, Fortuna, which does not. Yarrow is used in FreeBSD, OpenBSD and Mac OS X (also as /dev/random); the UNIX special file/dev/random, particularly the /dev/urandom variant as implemented on Linux; the function CryptGenRandom provided in Microsoft's Cryptographic Application Programming Interface; the Python function urandom in the os module, which uses /dev/urandom on Unix-based systems, including OS X, and CryptGenRandom on Windows-based systems; ISAAC based on a variant of the RC4 cipher; ANSI X9.17 standard (Financial Institution Key Management (wholesale)), which has been adopted as a FIPS standard as well. It takes as input a 64 bit random seed s, and a TDEA (keying option 2) key bundle k. The X9.17 algorithm can possibly be improved by using AES instead of TDEA.

In various embodiments, every second cell (dword) is scanned for the entire memory space (e.g., all of RAM). It is also possible to scan every cell for the portion of the memory where the scanning routine (and any other supporting code) resides, and every other cell for the rest of the memory. Malware may try to relocate the portions that are written and scanned, e.g., from all even cells to all cells in the lower half of RAM. This, however, requires mapping of each location, which will introduce a delay each time RAM is to be accessed. Memory management routines that are built in will only map entire blocks, and will not perform mappings from even cells to odd cells, etc. Malware can also attempt to relocate portions of the RAM contents to flash or other secondary storage. This, however, will cause delays as flash is slower than RAM.

If any portion of the memory is not overwritten with pseudo-random data, and later check-summed in the memory-printing routine, then this portion can be used to store data. For example, the portion of memory that is not taken up by the routine to scan memory can be overwritten with pseudo-random data and checksummed using every other dword or cell. For example, we may write and checksum only even dwords, and avoid odd ones. The odd dword locations can then be used to store programs and/or data that were resident in the memory before the detection process started; or compressed versions of these; or other representations of these (such as the names of programs or routines, or indications of their locations in flash). It can also be used to store temporary variables used during the memory-printing routine itself. Additional details regarding these techniques are provided below.

Memory Printing

Example 3

As with Example 1, only checksum even cells from the cells that were read to the cache. If the location to be read is in the area where the monolith kernel resides, also accumulate the contents of the odd cells that were read. (That can be done after all the even cells have been accumulated, and it need not be done in the order they appear.)

Communication Speeds

Example 4

One assumption that can be made is that the external helper is infinitely fast, and that the roundtrip latency is 2 ms. That sets the parameters in a very pessimistic manner, which causes extra work. Here are a few other parameter choices, for other roundtrip times. We also have parameter choices for a setting where the external helper is not infinitely fast, but only twice as fast as the client computer. (This is generalized to related assumptions, and is used to show the dynamics.) For each entry, we describe two values (inner_loop, outer_loop), which correspond to the number of iterations one has to make, using the previous parameters as a starting point:

| latency to external helper (ms) | 2 | 4 | 8 | 32 | infinity (=no connection) |
| --- | --- | --- | --- | --- | --- |
| infinitely fast helper: | (1024, 8192) | (2048, 4096) | (4096, 2048) | (16384, 512) | (8388608, 1) |
| double-speed helper: | (2048, 4096) | (4096, 2048) | (16384, 512) | (32768, 256) | (8388608, 1) |

If this is combined with Example 3, each iteration of the inner loop will become a bit faster; allowing a further increase of the number of iterations of the inner loop for each iteration of the outer loop, and correspondingly, a reduction in the number of iterations of the outer loop. This reduces the number of updates of the key, and the number of reports.

Note: It is not implausible to assume that the adversary has no connection to an external helper. It is possible to consider two versions of the software: one light-weight version (to be run frequently) that assumes no connection, and one heavy-weight (to be run, e.g., only once a day) that assumes the existence of an external helper. This makes the common case faster.

Example 5

For each round of the outer loop, at least part of the state is reported to the proxy, and at least part of the state is updated using a new key, contrasted with some embodiments in which the entire state is reported and the entire state is updated. It is also possible to report only a portion of the state, such as 1 byte of the state (e.g., the 1 LSB). It is also possible to offset only part of the state, such as 1 byte of the state (e.g., the 1 MSB). Other portions are also possible. This reduces the amount of data to be transmitted over to the proxy.

Since the state that is not reported continues to affect future states (that will be reported at least in part), one will get several checks of the same information, whether it is all reported or not. At the last iteration of the outer loop, the entire state can be reported. Since it becomes unlikely that an adversary can guess the updates even if only one byte is changed, and do that for each round it is involved, it is not necessary to update all bits with new key data.

Example 6

Serial communication is slow, and other types of communication are faster—e.g., using 3 G or WiFi. If the base station or access point acts as a proxy, that limits latency variance. One way this can be done is by adding a timer value to the packet to be transmitted to the external verifier. It is possible to consider two versions of the detection software (apart from what was described before): one light-weight version that uses 3 G, and one heavy-weight that uses serial communication.

Avoiding Large Numbers of Generations of Pseudo-Random Strings

Example 7

The repeated generation of many blocks of pseudo-random strings can be avoided in a variety of ways. If strings are offset (e.g., as described in Example 2), it is possible to use one and the same basic block (from PRG1) and offset this over and over with different strings from PRG2. Thus, it can be reused, not only within one verification, but also between verifications. It is also possible to generate a small number of strings using PRG1, and to combine these in different configurations for different invocations. For example, one may XOR together a three of an available 8 such blocks, and then offset the result with the output from PRG2. The selection of what three blocks to combine may be performed by the external verifier.

Example 8

It is also possible for the external verifier to use a relatively small set of such blocks (as described in Example 7)—such as 1000 all in all—for all clients. Each client would have to compute some of these and use them for some period of time, as described above. This limits the burden of the server-side component.

Increasing the Effects of Write Delays

Example 9

As explained above, basic blocks of pseudo-random strings can be pre-computed and written to RAM. If there is a malware agent present, this will incur a delay. This can be measured, just as can the memory-printing. One way to increase this delay is to write the blocks of pseudo-random data in a manner that is not sequential, but rather, in a way that cannot be anticipated by an adversary and which incurs additional delays if performed to flash memory (assuming the same memory mapping). For example, portions of data can be written, such as portions of the size of the cache line width, single words, or other sizes, and then a new location for the next write is selected. This new location can be selected by increasing the current location with a step (such as for the memory-printing), where this value step was received from the external verifier. This does not have to be the same value step as used for the memory printing. This incurs extra delays when flash is involved, as it would be for many typical scenarios where a malware agent attempts to survive and avoid detection. By making this change, we make it easier to detect cheating attempts in which the malware agent reads from flash.

Increasing the Effects of Recomputation Attacks

Example 10

In order to increase the impact of recomputation attacks (where the adversary attempts to compute the contents of a given cell in memory), it is possible to use blocks, such as those generated by PRG1, where a larger number of hash function computations need to be performed in order to determine the contents of a given cell. This can be achieved by combining several blocks (as described in Example 7), and by making each such basic block dependent on more values or require more one-way function computations to be performed. It is also possible to use other types of functions, and not one-way functions. By making this change, we make it easier to detect cheating attempts in which the malware agent computes the wanted contents of a given cell.

Screening and Identifying Content:

Example 11

Once the memory-printing routine has completed, and an external verifier has concluded that the target device (on which the memory-printing routine ran) does not have any active malware, then various security-sensitive routines can be run. Examples of these are as follows:
  (a) Scans of secondary storage to detect inactive malware.
  (b) Scans of secondary storage to detect unwanted programs, where a program may be considered unwanted if it is against a verifying organization's policy (e.g., is pirated, has not been approved for use in the context, and/or is not allowed under the terms of service of the user).
  (c) Scans of secondary storage to detect unwanted data, where data may be unwanted if it breaks a verifying organization's policy, (e.g., is pirated, is illegal, and/or has been agreed by the user of the target device not to be stored or used on the target device). A variety of types of data can be identified, including text, audio data, and video data.
  (d) Synchronization of updates with an external server, or of updates belonging to certain categories. (For example, only emails and not photos, or all user-generated content, or all content.)
  (e) Decryption of data, including where data may be used for authentication.

(f) Display of audio-visual material (e.g., that must not be accessed outside the secure mode).

(g) Access to sensitive resources, whether on the device or external sources. Examples include access to a voting program (e.g., in which the user casts a vote), access to a password store, access to a banking application, and access to a banking transaction (e.g., a transfer) within a banking or other application.

Using the detection of "unwanted data" as an example, suppose a list of signatures of content purchased by the user is received from an external server. Content on the device can be compared to these signatures to determine if any content has not been purchased (i.e., is not matched to a signature) is present on the device. Such unmatched content can then be screened to detect if it is content that should have been purchased in order to be used on the device. If there is such a match, an external service provider can be alerted, the content can be erased or otherwise made not accessible, and/or the user can be notified. As another example, if the content is out of date (i.e., is a first version), the content can be automatically updated (i.e., to a second version).

One technique for matching unmatched content (e.g., to a list of descriptions of data that ought to be licensed) is as follows. Suppose a text signature of a copyrighted book is created using a 50 word segment of the book. Any text that matches this text signature fully or to a threshold extent can be considered to "match" the book. Fuzzy matching techniques can be used such that removing or changing a small number of words will not affect the match. In some embodiments, multiple signatures are created for the book (or other content file), such as by creating three different 50 word segments. An attacker (in this case, potentially the owner/user of the device) would not know which signatures the device would receive (e.g., from the external service) to perform comparisons with, so he would not know which portions of the file to mutilate in an attempt to avoid detection.

One way to evaluate audio data is through the use of signatures that are frequency-spectrum graphs of selected portions of the file, or other characterizations of the data. This makes it possible to (a) whitelist approved content that has been acquired in an approved manner; and (b) screen the remaining content and distinguish user-generated or otherwise approved content from unwanted content, content that has not been acquired in the proper way, or which otherwise break the terms of service. It is possible to report on the presence of various data files based on the matches. This can be used for auditing purposes; to discourage piracy; and to make synchronization of devices faster. For example, instead of synchronizing an entire movie, book, application, or song, it is possible to instead notify a backup server of the existence of one of these files based on the match with the signature, after which no further data needs to be transmitted. In situations where data is not likely to be modified or corrupted, it is also possible to use the hash of the file or another unique function of the file as a tag that is communicated; however, where files may be intentionally or accidentally modified or where a large number of possible variants may exist, in some embodiments the file is identified using a signature, which could allow for fuzzy matching, e.g., by comparing for a large but not complete correspondence.

Figure 15:
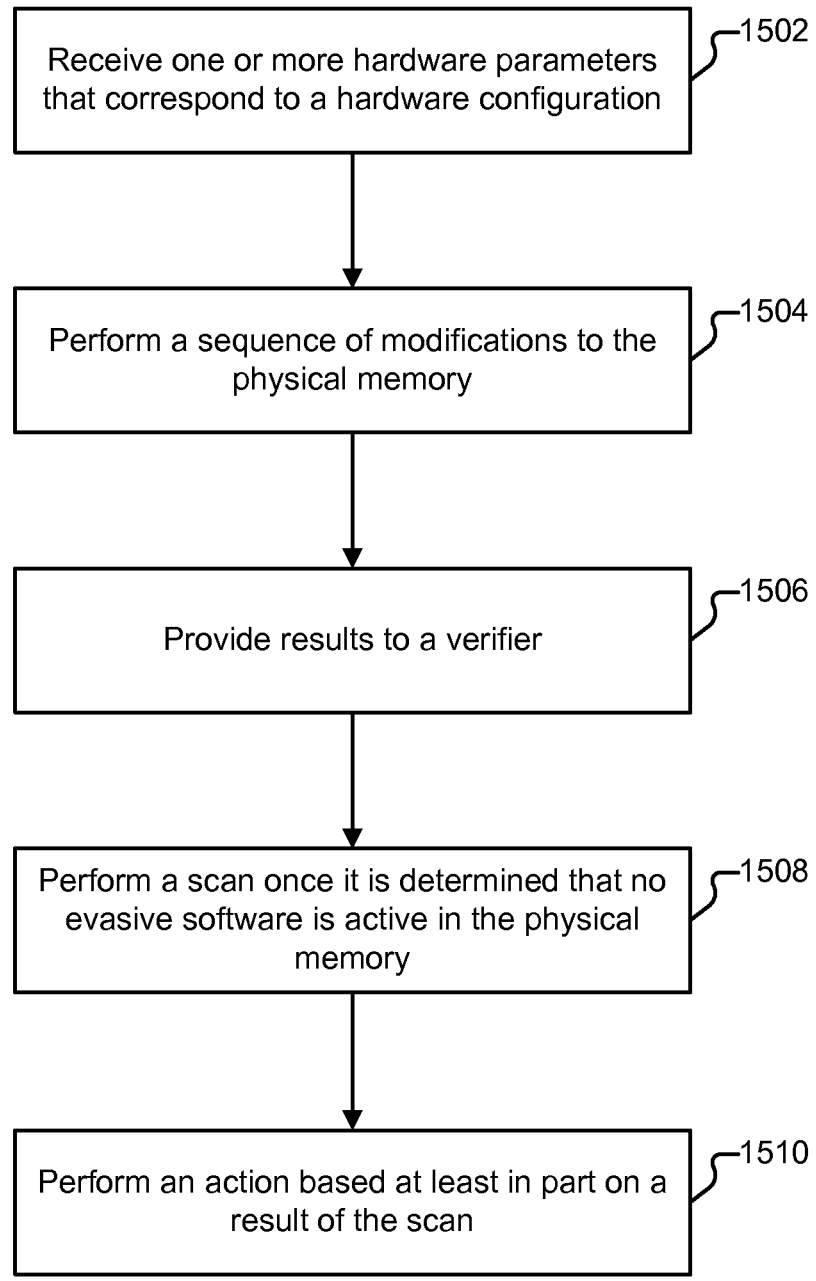
FIG. 15 illustrates an embodiment of a process for performing a device audit.

FIG. 15 illustrates an embodiment of a process for performing a device audit. In various embodiments, the process shown in FIG. 15 is performed by device 102. Portions 1502, 1504, and 1506 correspond to portions 302, 304, and 306, respectively, of the process shown in FIG. 3. As explained above, once an external verifier has concluded that the target device does not have any active malware, a variety of security-sensitive routines can be run (1508).

Suppose a user has an electronic book application installed on device 102 and has purchased several books. A friend of the user has provided the user with a pirated copy of a book (for which the user has not paid), either in the same format as other electronic books stored on device 102, or in an alternate format. As one example of the processing that can be performed at 1508, device 102 is scanned for the presence of copyrighted text based on fingerprint information received from the verifier. Specifically, after receiving as instructions: "search for an occurrence of 'hello neighbor,' then count the number of nouns that occur in the next 50 words," a scan according to those instructions is performed at 1508.

More sophisticated scanning techniques can also be used, such as by locating within a text an occurrence of three particular verbs within a particular distance of one another, then counting the number of words longer than four characters and the number of prepositions. Other examples of processing that can be performed at 1508 include performing frequency analysis scans of audio/visual files on the device. At 1510, an action is performed based at least in part on the scan performed at 1508. Using the "hello neighbor" example, at 1510, if the scan results in a determination of the presence on device 102 of a copyrighted work for which payment has not been received from the owner of device 102, the copyrighted work is deleted. Other actions can also be taken at 1510. For example, instead of deleting the implicated text, the user can be presented with a "nag" screen each time the user accesses the text (or the electronic book application) reminding the user to pay for the text.

Additional Information Regarding Interleaving Techniques

Figure 16:
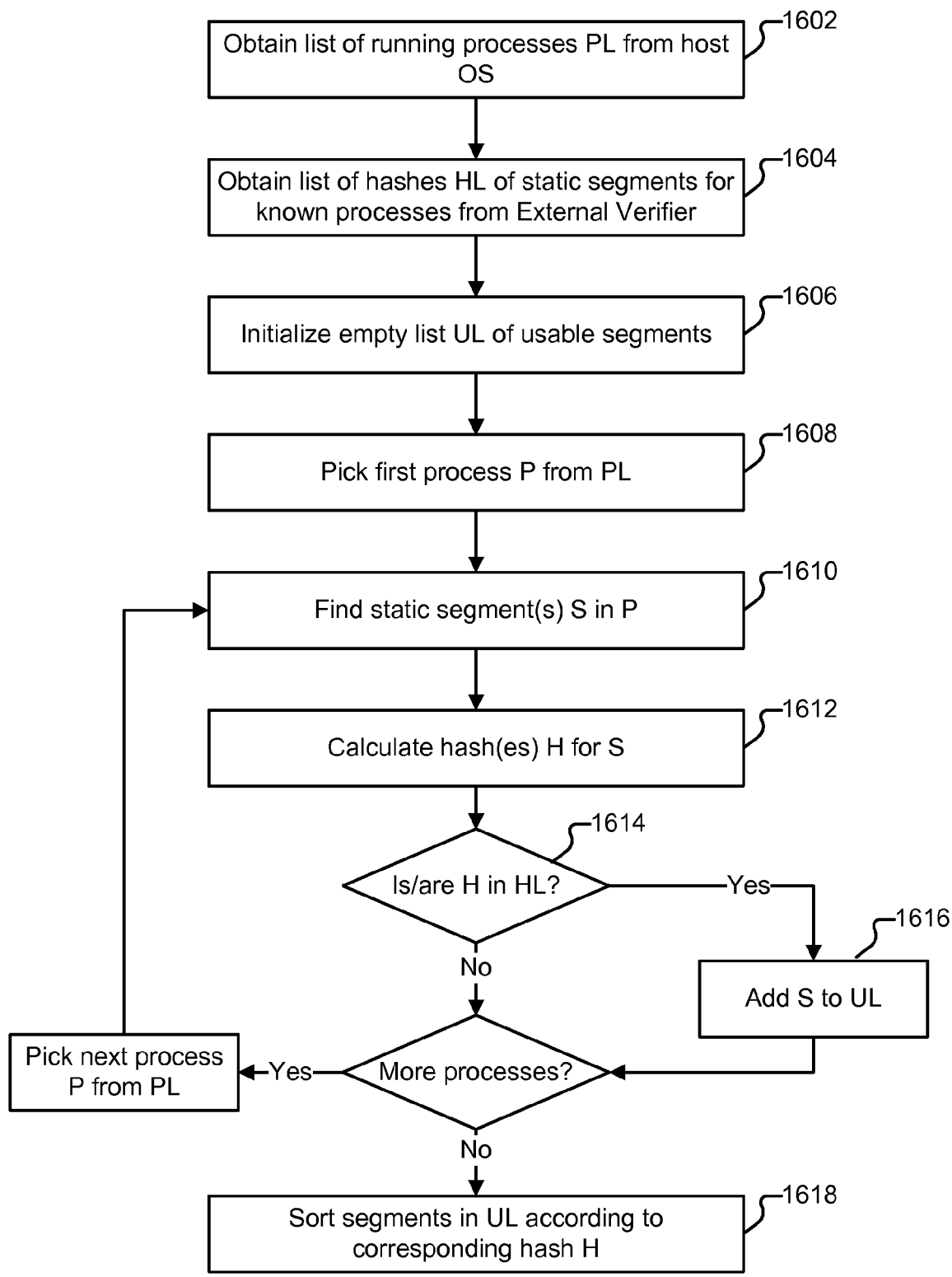
FIG. 16 illustrates an embodiment of a portion of a process for performing a device audit.

In some embodiments every other cell in RAM is filled with a pseudorandom sequence and then the integrity of those cells is verified. In this scenario, at least half of RAM needs to be free (i.e., available for overwriting). One approach is to temporarily move enough content to secondary storage before performing the process. Another approach is to incorporate known parts of RAM as part (or all) of the pseudorandom sequence. This approach will be described in the following paragraphs and a portion of an embodiment of the process is illustrated in FIG. 16. In various embodiments the process shown in FIG. 16 is performed by device 102.

In this approach the pseudorandom sequence is augmented with portions of the contents of RAM that is also known to verifier 106. RAM content may include any combination of the following: static and dynamic executable code and data in the kernel, system applications, user downloadable applications, state information for the applications, and user data (e.g., photographs). Static RAM content (both executable code and data that is known to the external verifier) can be used by the algorithm and does not need to be backed up as it can be restored by reversing the process of the memory printing. The content can be used instead of pseudo-random content, or it can be combined with it in a reversible manner, e.g., by XORing RAM content with a pseudo-random string, or with another sequence intended to sufficiently randomize it. One may use several portions of RAM content and combine them with each other in some manner that is reversible, and where the results are hard to anticipate by an adversary. It is possible to make the contents of particular cells hard to anticipate even if they have known content simply by making the locations of the known material hard to anticipate, as demonstrated before using the reading of material according to a sequence determined by a step value.

A list of all running processes is obtained through the host OS (1602) and a list of hashes (or other tags or descriptions) is obtained from verifier 106 (1604). A list of usable segments is initialized (1606). For each process in the list of processes (1608): static segments are identified (1610). A hash of the identified segment(s) is calculated (1612) and compared with a list obtained from verifier 106 to see if the process is known (1614). If it is known, the segment is classed as usable (since verifier 106 can recreate the same RAM image in its memory) (1616). The usable segments are sorted according to the hash of each segment (1618), or in another manner that results in a predictable ordering given known content. This is done to avoid the need of communicating the exact locations of each segment from device 102 to verifier 106. Alternatively, location information can be communicated. This location information can be a short description indicating how sorted or otherwise ordered content is located, or longer descriptions indicating where each portion is located.

The segments are rearranged in physical RAM of client 102 and may include conversion from a virtual address space. The usable segments are placed in one half of physical RAM and unusable segments (unknown to verifier 106) are placed in the other half. In some embodiments, if there are too many unusable segments to fit in half of RAM the overshooting part is backed up or ignored, as applicable. A priority can also be applied to the unusable segments, such that state information and user data is given a higher priority over user applications when determining which portions of the unusable segments to backup and which will remain in RAM. If there are too many usable segments to fit in half of RAM the overshooting part may be stored in the half reserved for unusable segments, or may be ignored. The two halves of RAM are then interleaved so that contents of one half are placed at even RAM cells and the other half on odd RAM cells. As used herein, a "cell" is the native word size of the CPU or other appropriate unit.

In some embodiments cells containing the usable segments are perturbed by a pseudorandom sequence (e.g., seeded by verifier 106). This can be done either before or after interleaving the two RAM halves. Protection from malware can also be achieved without perturbing the usable segments with a pseudorandom sequence. For example, the cells containing the pseudo random sequence can be internally shuffled (and optionally repeated to fit the entire half of RAM). In this scenario, external verifier 106 determines the type of shuffling to be employed. One example is to use a "card shuffling" algorithm, such as the Fisher-Yates shuffle, with a random number generator that is seeded by the verifier. If not the entire half of RAM dedicated to usable segments is filled, the remainder can be initially filled with a pseudorandom sequence, or it can alternatively be topped up with copies of the usable segments.

Additional examples are as follows: Each of the dwords of the material can be rotated one bit left, XORed with a constant, or XORed with a value from a function. The constant and/or function is in some embodiments provided by verifier 106. For example, verifier 106 can send a value OFFSET=120, and each dword of the material is XORed with 120 before being written. A sequence of dwords of the material can also be XORed or otherwise manipulated using a sequence of values, such as values generated from a pseudorandom generator or approximation thereof, where the seed is provided by verifier 106, or provided by some other trusted source that also provides it to the verifier. The de-obfuscation process after the memory-printing process would undo these offsets by rotating one bit right, XORing in the same constant or sequence, or more generally, reversing the obfuscation operations.

The obfuscation process can also involve writing a sequence of material dwords in a manner that is not predictable a priori to an attacker, e.g., using a step value or a function that defines the order. This could be the same or another step value than used for the read order, and could be an independently chosen value. In the case where the write order is used as an obfuscation process, the de-obfuscation process would read back to continuous blocks matching the state before the obfuscation.

These types of obfuscation can be combined, and can be used along with yet other obfuscation techniques. In addition, the interleaving techniques described herein can be used in which some portions of memory is skipped when performing the obfuscation/deobfuscation and also when the memory-printing process is performed.

Figure 17D:
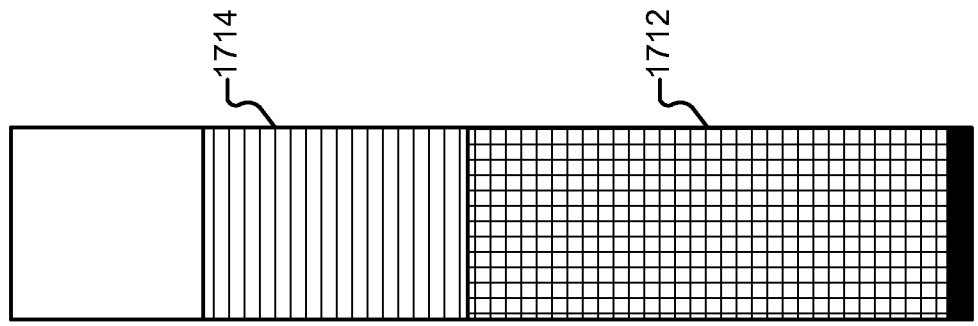
FIG. 17D illustrates a conceptual view of a physical memory.
Figure 17C:
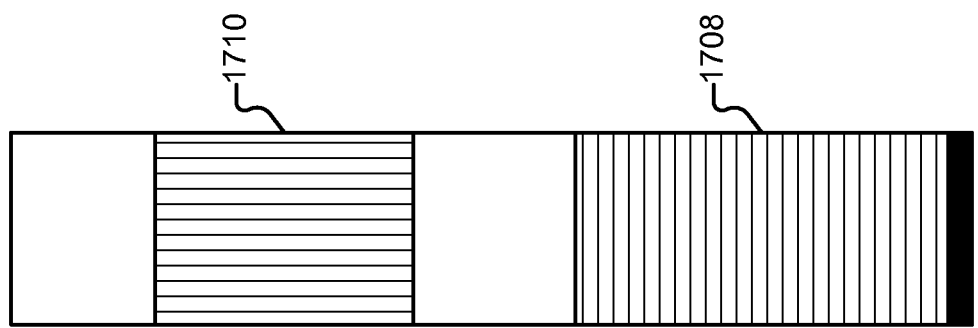
FIG. 17C illustrates a conceptual view of a physical memory.
Figure 17B:
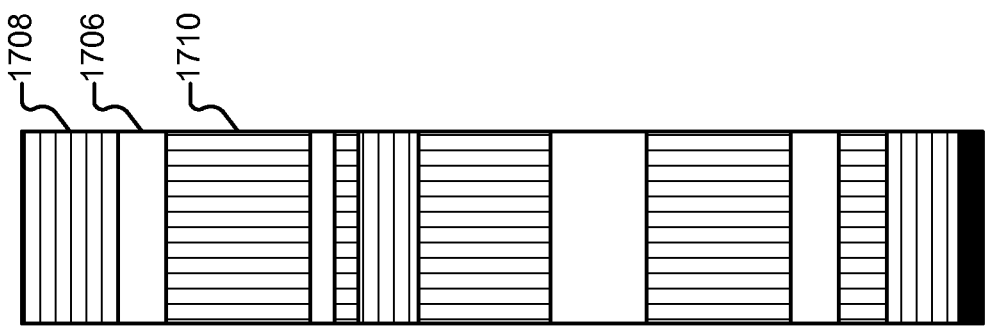
FIG. 17B illustrates a conceptual view of a physical memory.
Figure 17A:
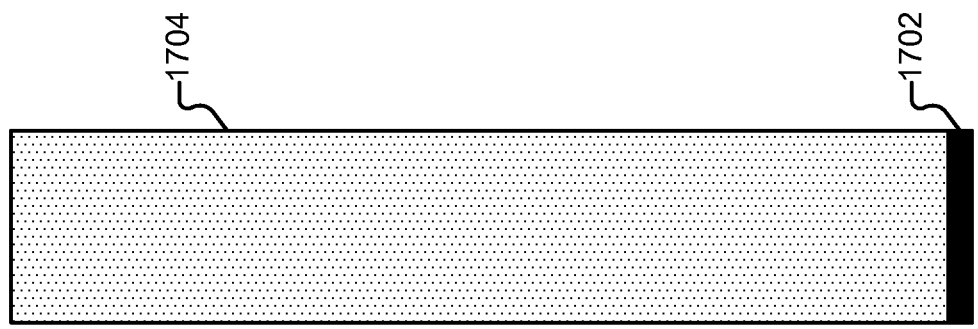
FIG. 17A illustrates a conceptual view of a physical memory.

FIGS. 17A-17D illustrate conceptual views of a physical memory. FIG. 17A illustrates the contents of the physical memory at the outset of the process shown in FIG. 16. Specifically, portion 1702 of the memory represents a microkernel (e.g., auditor 506), and the remainder of the physical memory (1704) has not yet been classified. In FIG. 17B, the various types of RAM contents are identified. Specifically, the white portions (e.g., 1706) indicate unallocated space which is zeroed out. The horizontally striped portions (e.g., 1708) indicate usable segments and the vertically striped portions (e.g., 1710) indicate unusable segments. In FIG. 17C, the respective types of contents are grouped together. In FIG. 17D, the usable and unusable segments are interleaved (1712). There are more usable than unusable segments, as indicated in region 1714. Once the physical memory is in a state such as is shown in FIG. 17D, additional processing can be performed, such as is described in more detail below.

Figure 18:
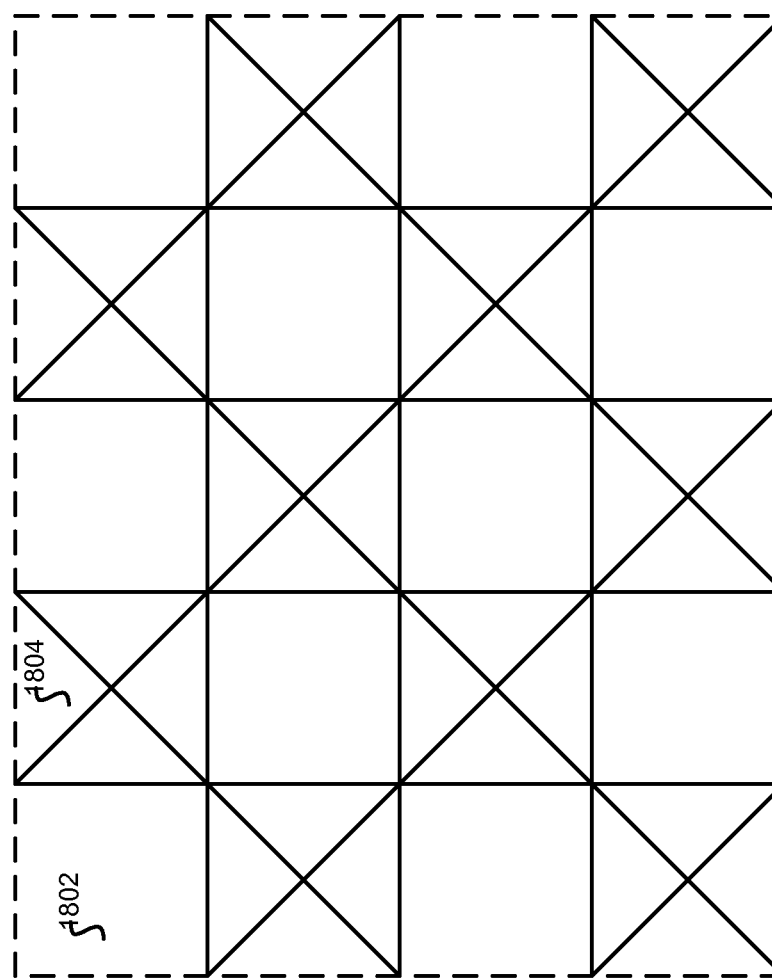
FIG. 18 illustrates a conceptual view of a portion of a physical memory.

An alternate view of a portion of the memory shown in FIG. 17D is presented in FIG. 18. In the example shown, each of the odd numbered dwords (e.g., empty box 1802) is used to hold "unusable" segments, while each of the even numbered dwords (e.g., checked box 1804) is used to hold "usable" segments.

Figure 19:
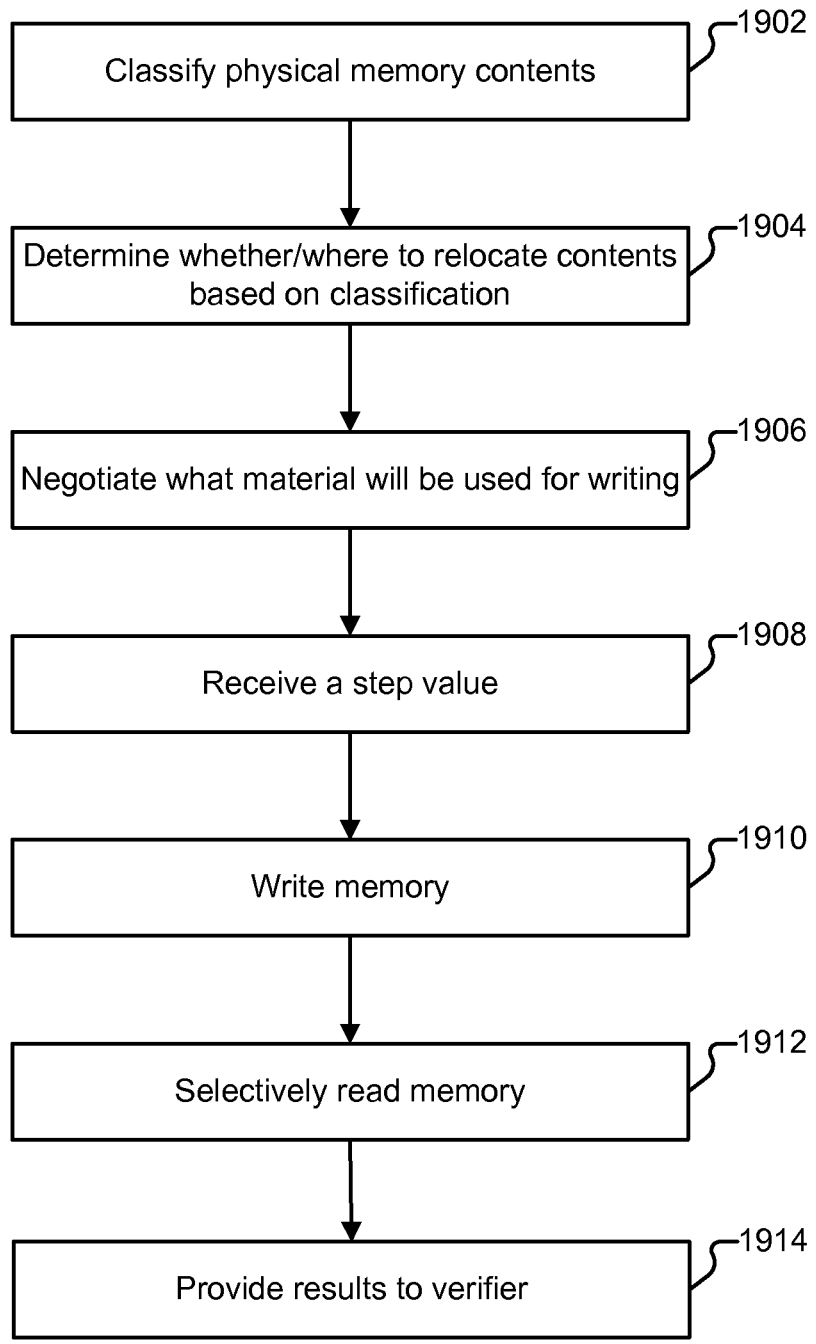
FIG. 19 illustrates an embodiment of a process for performing a device audit.

FIG. 19 illustrates an embodiment of a process for performing a device audit. In some embodiments the process shown in FIG. 19 is performed by device 102. The process begins at 1902 when contents of a physical memory are classified. As one example, at 1902, the contents of memory 204 are classified by auditor 506. One way of classifying the contents of memory 204 is into "usable" and "unusable" segments, as described above. The classification can be further refined, such as by subdividing the "unusable" contents into buckets based on factors such as whether the contents are stored elsewhere (e.g., in memory 206), whether the contents are applications, state information, or user data, etc.

At 1904, a determination is made as to whether (and if so, where) to relocate contents of memory 204 based on the classification determined at 1902. For example, applications (and/or the kernel) appearing on a whitelist (e.g., for which hashes have been received from verifier 106) are designated for use by the memory printing routine, and may ultimately be copied into even dwords such as even dword 1804 (potentially after being obfuscated or otherwise transformed). Items that will not appear on such a whitelist (and are thus "unusable") include certain applications (e.g., user compiled) and data/state information. A copy of the applications will exist elsewhere, such as in memory 206. In the case of data/state information, copies may or may not exist elsewhere. Further, of the data/state information that is present only in memory 204, some may be needed or desired by the user to be retained (e.g., a photograph), while some may not (e.g., the state of a phone application). As explained above, if there are too many unusable segments to fit in half of the RAM (e.g., the odd dwords), the overshooting part can be backed up or ignored, as applicable. Preferences for/prioritization of whether to include a given unusable segment in the half of RAM, to back it up, or to ignore it is configurable. For example, in the event there are too many unusable segments, data/state information that is present only in RAM can be designated as material that is to stay in RAM (i.e., be moved into the odd dwords), while unusable applications can be ignored (e.g., because the information is already stored in memory 206). As another example, instead of preserving an application in RAM, a determination can be made at 1804 to record the name of the application (or other reference to the application) either in a portion of RAM (i.e., odd dwords) or in memory 206. In another embodiment, usable applications are stored in both even and odd cells, where the even cells are XORed with an obfuscating string as well. In yet another embodiment, usable applications are stored in both even and odd cells, with all of these being XORed with an obfuscating string. In addition, location information is communicated to a verifier, or a particular order is imposed on portions of the material stored in RAM. This is done both to allow the external verifier to reconstruct the RAM memory contents later to be accumulated, and to allow the device to reconstuct the applications and their state from the material stored in even and odd cells.

At 1906, a negotiation of what material will be used for writing the even cells is made between verifier 106 and device 102. The negotiation can take many forms. For example, at 1906, device 102 may provide verifier 106 with a list of applications and verifier 106 may instruct device 102 to use particular applications (in a particular order) and/or the device kernel to overwrite the even dwords. As another example, verifier 106 may instruct device 102 to use certain system applications that are known to be preinstalled on device 102, without polling device 102. As yet another example, verifier 106 may instruct device 102 to use particular applications as combined with a pseudorandom string (seeded by verifier 106). In some embodiments the seed is provided by verifier 106 only after a determination of which other material (e.g., usable segments) will be used for writing has been made. For example, device 102 could provide to verifier 106 an identification of its usable segments (e.g., by name or by hash value) and if the usable segments are acceptable to verifier 106, verifier 106 responds with a seed. In some embodiments (e.g., if device 102 does not include any usable segments), verifier 106 instructs device 102 to use a pseudorandom string, only, to write the even dwords, and does not use the "usable" segments described above.

At 1908, a step value is received from verifier 106. In some embodiments the processing of 1906 and 1908 are combined and/or portions are omitted as applicable.

At 1910, the physical memory is written in accordance with the determination(s) made at 1904 and the negotiation made at 1906. For example, at 1910, any unusable segments that will overflow half of the RAM are copied to memory 206 as applicable. As explained above, in some cases, rather than writing information such as an entire application, a reference to the application (such as its name or location) is instead written. By doing so, instead of requiring a full write to and subsequent read from secondary memory for a given application, only a small write (and the full read) will be required to restore the application after the process shown in FIG. 19 completes, achieving a considerable speed improvement. Other examples of writing that occur at 1910 include writing the material negotiated at 1906 to the even dwords (including both static segments and including any pseudorandom data generated from a seed) and writing the odd dwords with the unusable segments that do not overflow.

At 1912, physical memory 204 is selectively read. In some embodiments, portion 1108 of the process shown in FIG. 11 is performed at 1912. Either all of memory 204 or a portion of memory 204 may be read at 1912. For example, instead of reading all of memory 204 (or everything but the microkernel), in some embodiments only the even dwords are read (e.g., in accordance with the step value received at 1908). The accumulation of content that is read can be made using a variety of methods. One that already has been mentioned is to use a so-called accumulator, which is a type of cryptographic function that does not have particular homomorphic properties. In another embodiment, a so-called cryptographic hash function is used to combine the content that is read, In yet another embodiment, a combining function is used, for which it is difficult to anticipate the result without knowledge of the input material (the content that is read), and for which it is difficult to create alternative memory contents in very short time, for which the expected function output value is computed, but where the alternative memory contents allow hiding of unwanted instructions or data. At 1914, the results of the computation performed at 1912 is proved to an external verifier. In some embodiments portion 1110 of the process shown in FIG. 11 is performed at 1914. The writing to and reading from RAM is used above as an example. Other types of memory can also be used in accordance with the techniques described herein instead of or in addition to RAM.

After the process shown in FIG. 19 completes, physical memory 204 can be returned to the state it was in prior to the process of FIG. 19 being performed. For example, any applications that were previously loaded in RAM can be reloaded. Other actions can also be performed upon completion of the process shown in FIG. 19 such as a reboot of the device. After the verification has completed, the original state of RAM is constructed, or desirable portions of this original state. This can be performed in phases, with selected programs, applications or routines being executed between such phases. For example, in one embodiment, the browser and portions of its state may be reconstituted in a first phase, after which a particular webpage is accessed. After this access has completed, a second phase is performed, where this second phase may consist of reconstituting additional applications and their state. This reconstitution process reads back selected portions of code and data into portions of RAM where it can execute. In addition, appropriate contents of the stack and other state is reconstituted in order to allow execution to continue where it left off, where desirable. In the case where RAM contents are stored in RAM in a manner that does not allow for execution, e.g., with data spread out in odd cells, and instructions stored in even cells.

Two example ways in which the process can be unwound are: (1) by backtracking the steps of the process back-to-front, and (2) by using another front-to-back process producing the same results. The first alternative requires the pseudorandom sequence generator(s) to be able to run in reverse to undo data shuffles and (possible) XOR perturbs. The second alternative requires finding the inverse algorithm for data shuffling and XOR perturbing.

Figure 20:
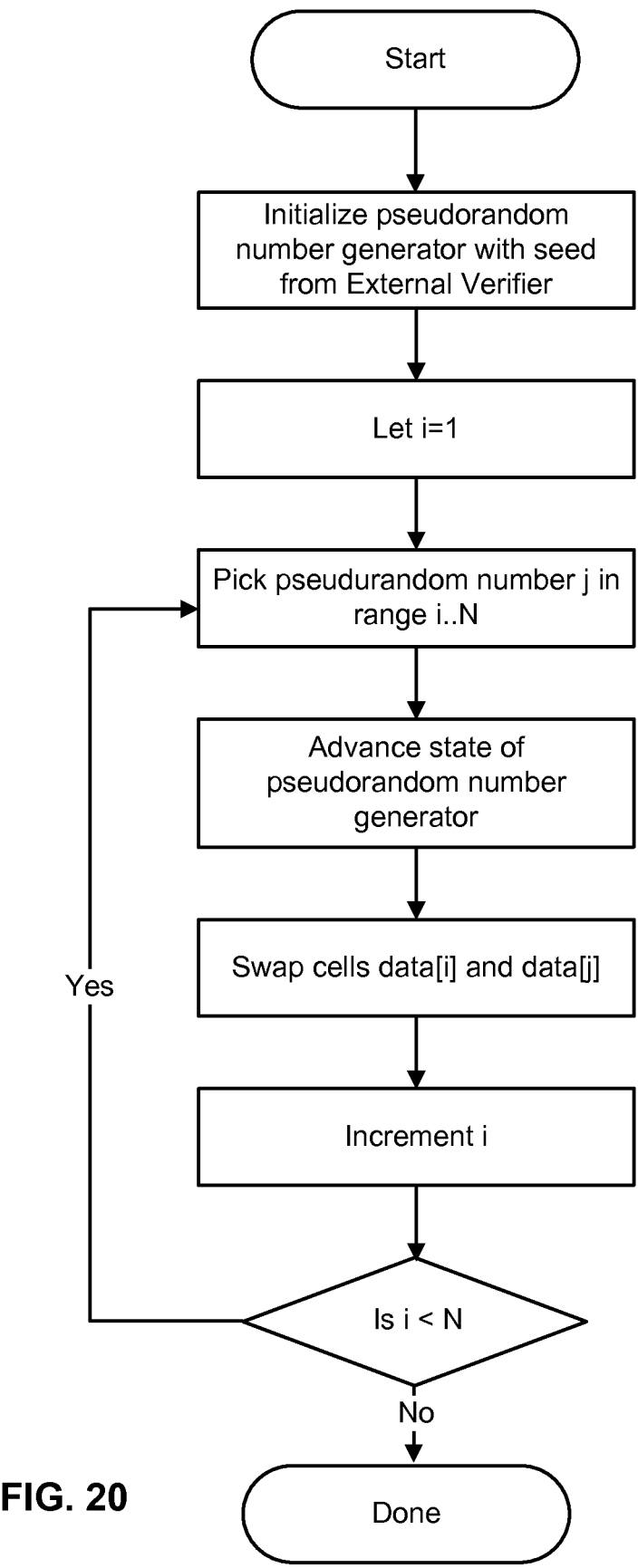
FIG. 20 illustrates an embodiment of a process for manipulating the physical memory of a device.
Figure 21:
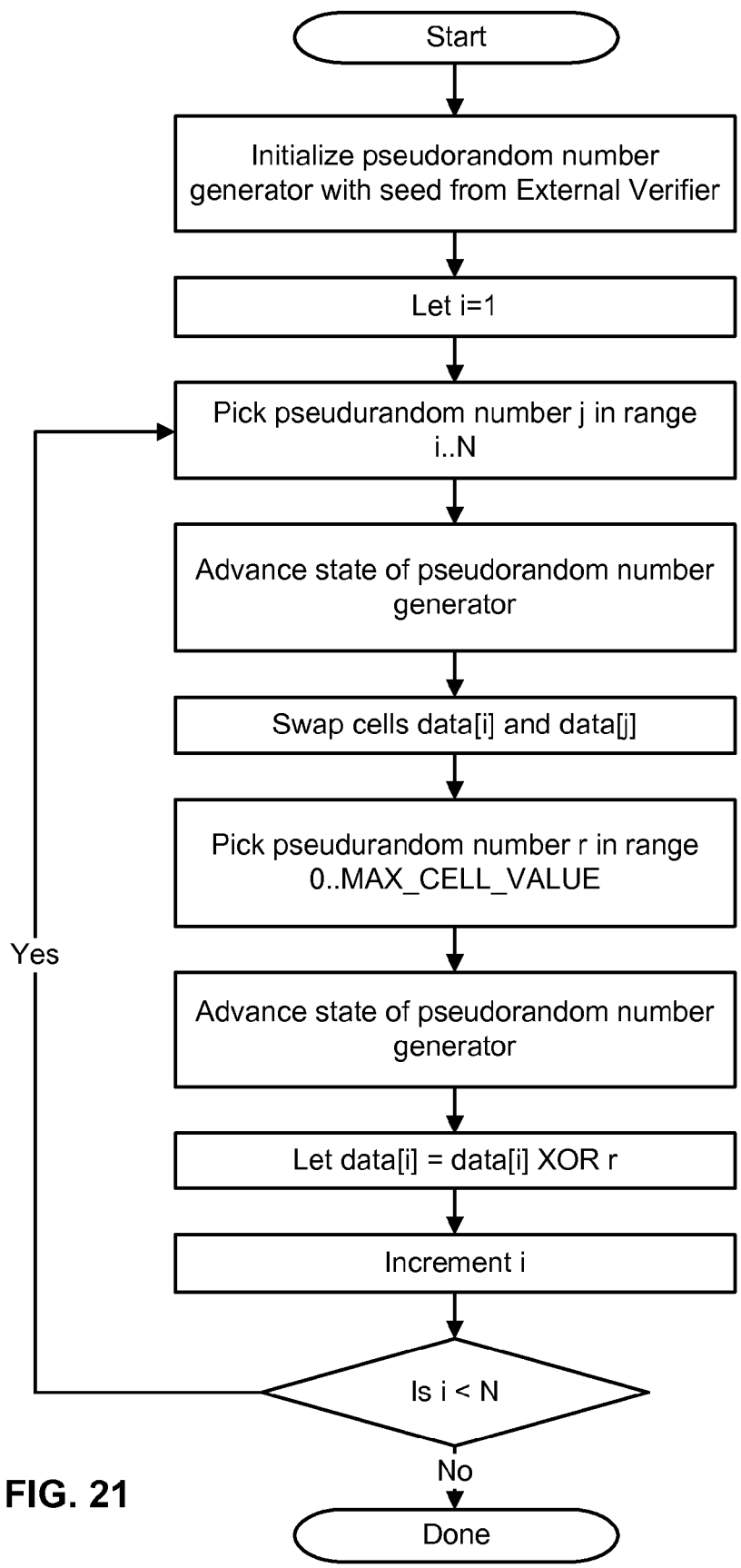
FIG. 21 illustrates an embodiment of a process for manipulating the physical memory of a device.
Figure 22:
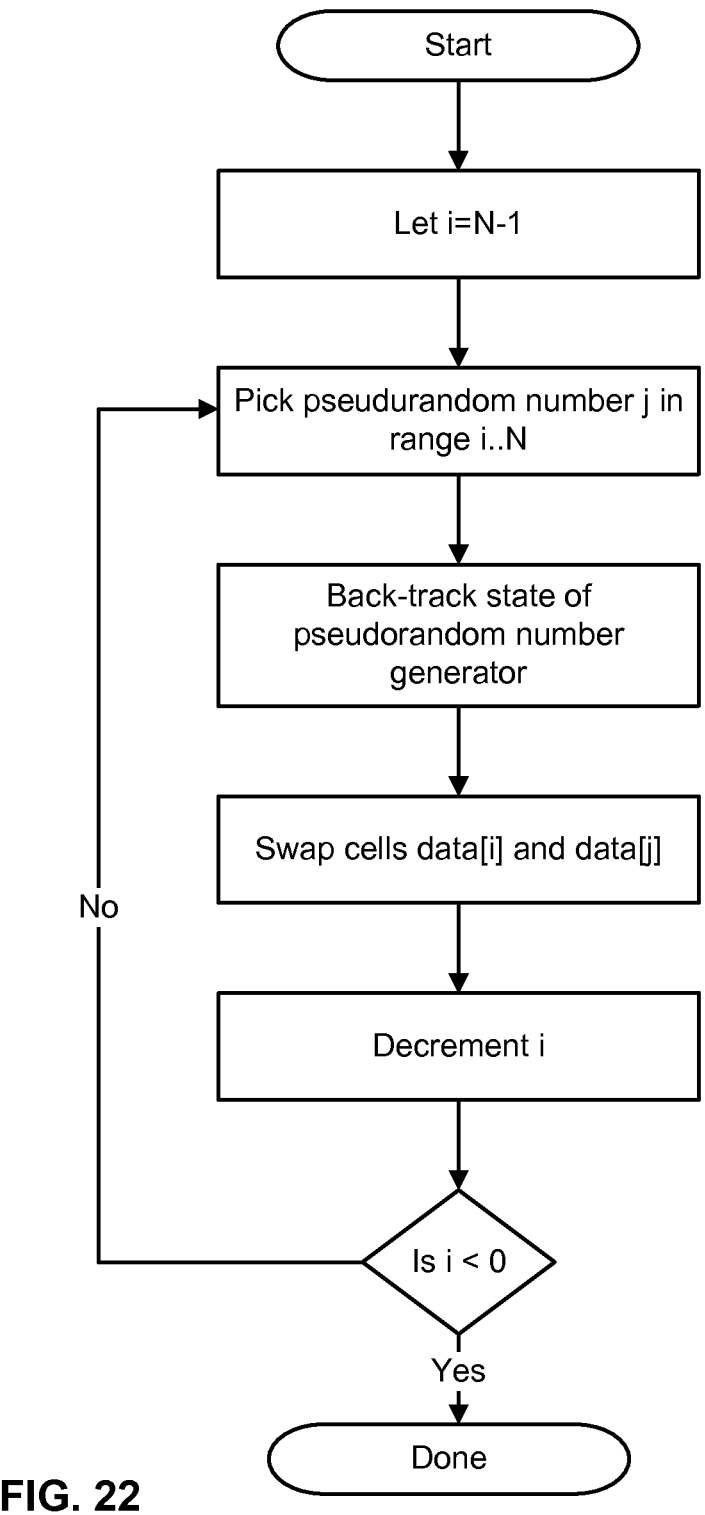
FIG. 22 illustrates an embodiment of a process for unwinding a device after the process shown in FIG. 20 has been performed.
Figure 23:
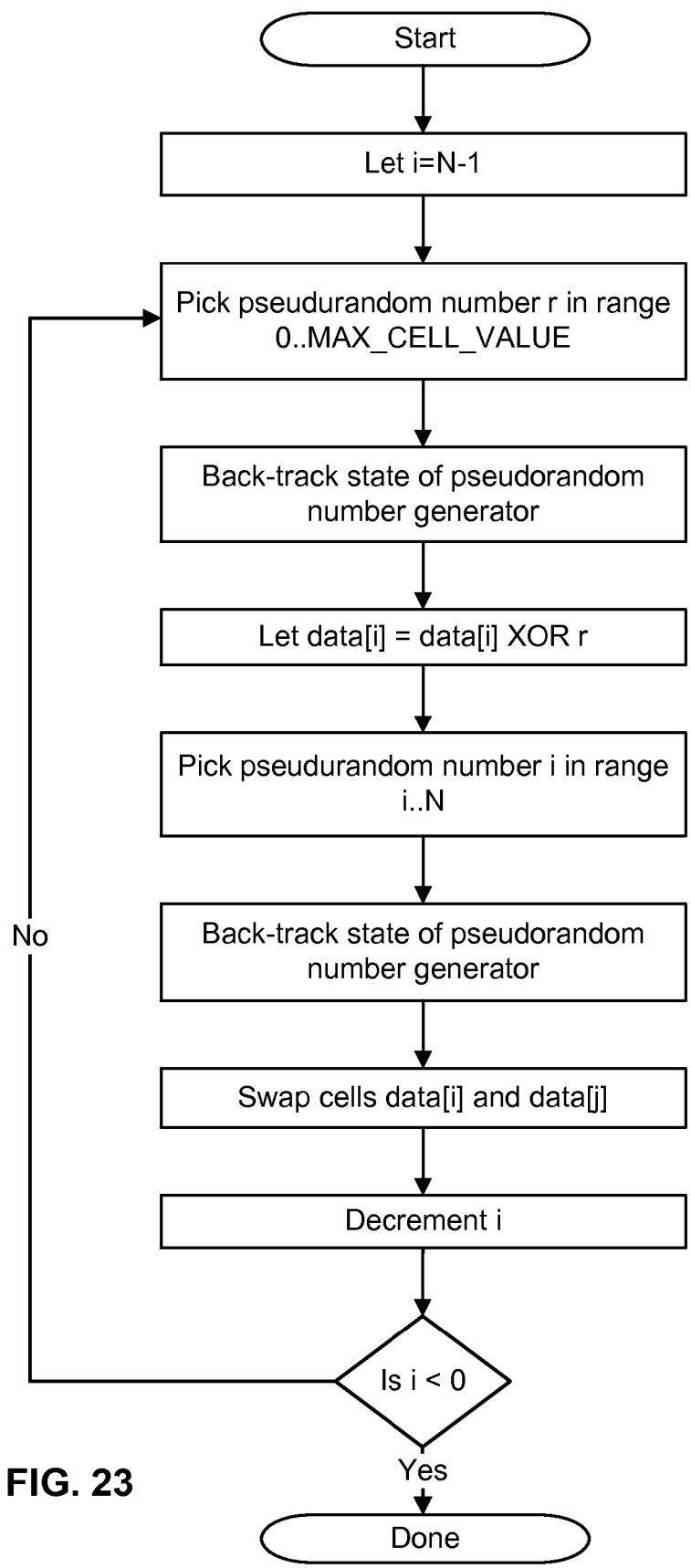
FIG. 23 illustrates an embodiment of a process for unwinding a device after the process shown in FIG. 21 has been performed.

The first approach is suitable if a shuffling algorithm such as Fisher-Yates has been used. Pseudorandom numbers in a diminishing range are generated to identify the cells with which to swap contents. See FIG. 20. An extended version which also perturbs data is illustrated in FIG. 21. Note that the exact order of the blocks in the flow charts can deviate and still produce equivalent results. The processes can be unwound or reversed by following the corresponding flow charts in FIG. 22 and FIG. 23 (with simple shuffling and shuffling with data perturbation) respectively. The steps are essentially reversed and rely on a pseudorandom sequence generator that can be put in reverse, such as a linear feedback shift register. In the example shown in FIGS. 20-23, index 1 is used for the first cell.

Figure 24:
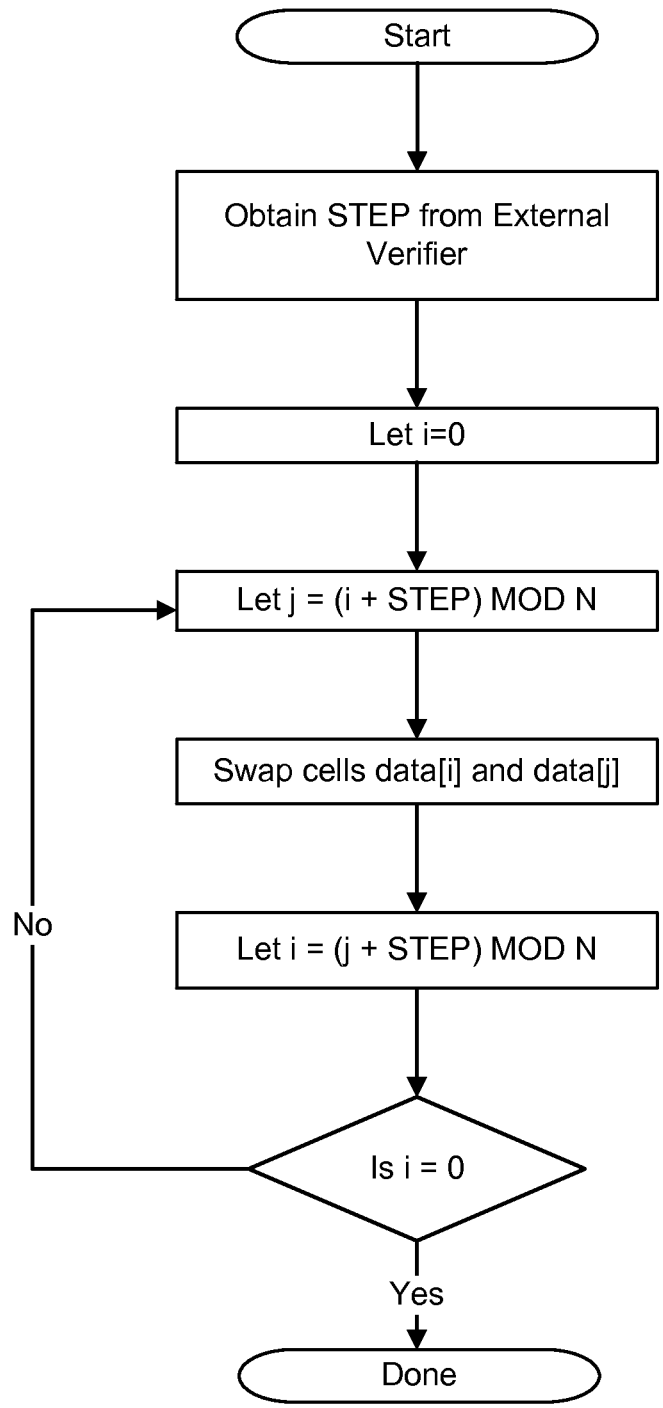
FIG. 24 illustrates an embodiment of a process for manipulating the physical memory of a device.
Figure 25:
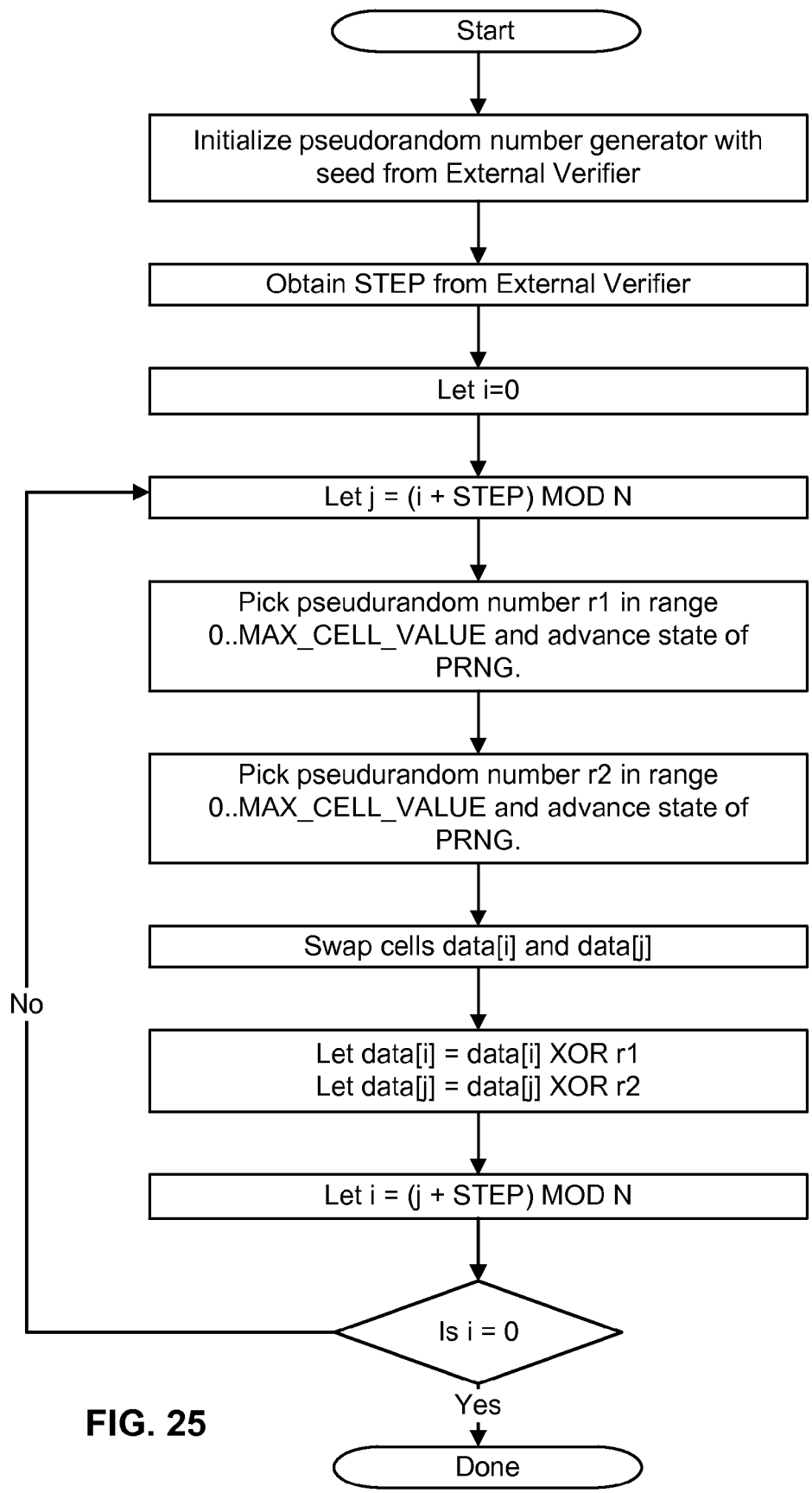
FIG. 25 illustrates an embodiment of a process for manipulating the physical memory of a device.
Figure 26:
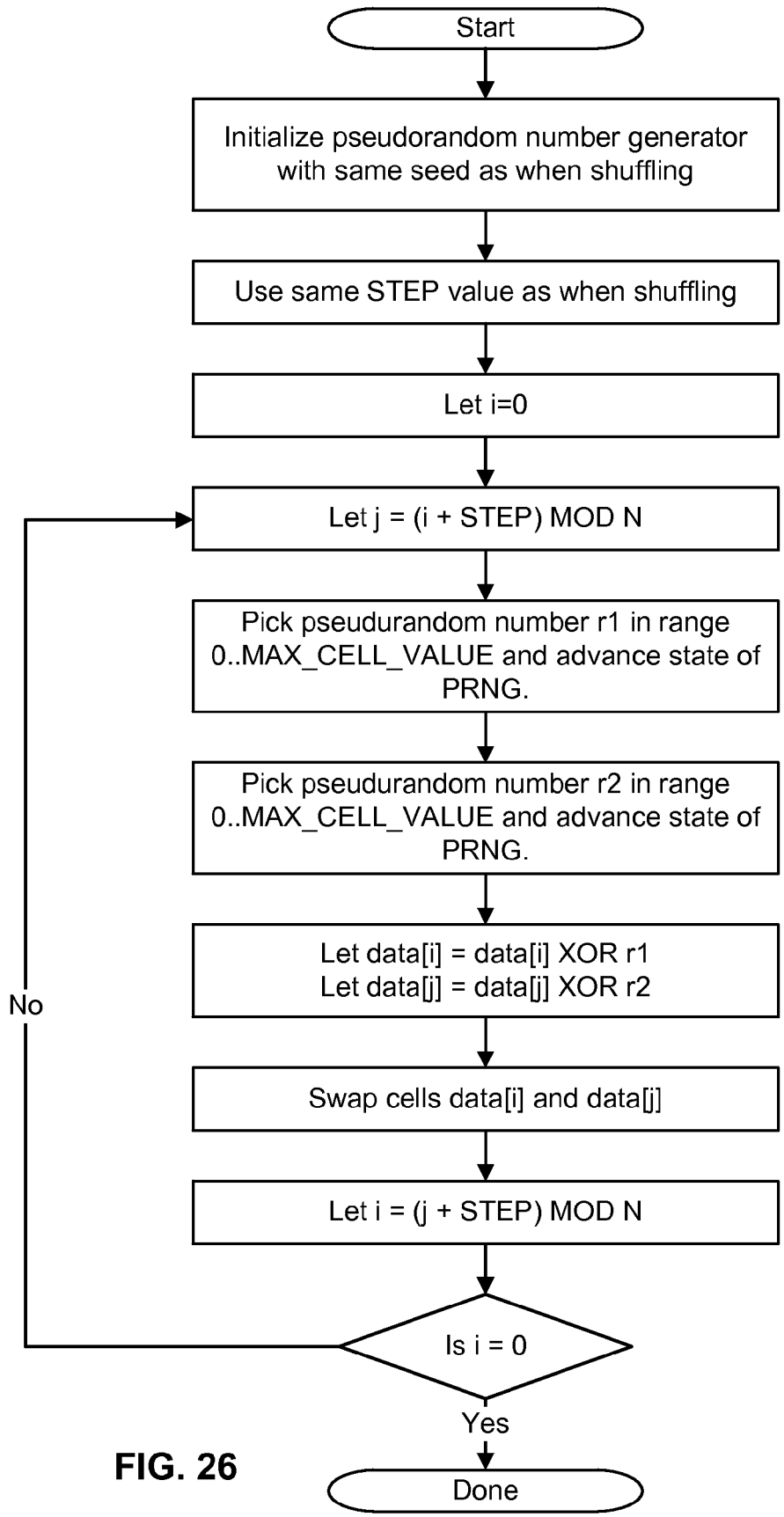
FIG. 26 illustrates an embodiment of a process for unwinding a device after an audit.

The second approach can be used with a traversal of the cells using a step size that is relatively prime to the number of cells. This is illustrated in FIG. 24. Note that index 0 is used to identify the first cell in FIG. 24. Back-tracking this algorithm requires running the same algorithm again with the same step value. XOR-perturbing the cells using a pseudorandom sequence can further augment the second approach. This is illustrated in FIG. 25 where two pseudorandom values are XORed onto the cells after they are swapped. The algorithm needs to be slightly changed to reverse the process, as can be seen in FIG. 26 where the XORs are placed before the swap rather than after. Note that the two algorithms can be swapped, i.e. using FIG. 26 for scrambling and FIG. 25 for descrambling.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a physical memory; and
one or more processors configured to:
receive one or more hardware parameters that correspond to a hardware configuration and receive, from a first unit, initialization information, wherein the initialization information includes one or more values provided by a second unit;
selectively write to a set of cells of the physical memory in accordance with a function;
selectively read the physical memory and determine at least one result; and
provide the result to the first unit, wherein the first unit is configured to generate a timing measure associated with the result, and wherein the first unit is further configured to provide the result and the timing measure to a third unit;
wherein the third unit is configured to generate a security determination based at least in part on the result and the timing measure.

2. The system of claim 1 wherein the set of cells consists of even numbered dwords.

3. The system of claim 1 wherein the one or more processors are further configured to classify the contents of at least a portion of the physical memory.

4. The system of claim 3 wherein the one or more processors are configured to classify the contents at least in part by determining whether a segment is static or dynamic.

5. The system of claim 1 wherein the one or more processors are configured to selectively write the set of cells based on instructions provided by the second unit.

6. The system of claim 5 wherein the instructions include an identifier of at least one application the static portion of which is to be used in the selective writing.

7. The system of claim 1 wherein the one or more processors are configured to selectively write at least in part by writing an executable portion of a kernel to a subset of the cells of the physical memory in accordance with the function.

8. The system of claim 1 wherein the one or more processors are configured to selectively write at least in part by writing an executable portion of a known-to-the second unit application to a subset of the cells of the physical memory in accordance with the function.

9. The system of claim 8 wherein the one or more processors are configured to send the name of the application to the second unit.

10. The system of claim 8 wherein the one or more processors are configured to receive at least one of a hash and a description of the application from the second unit.

11. The system of claim 1 wherein the one or more processors are further configured to determine whether to copy contents of a portion of the physical memory to a secondary memory.

12. The system of claim 1 wherein the one or more processors are further configured to determine whether to write an identifier associated with an application resident in the physical memory.

13. The system of claim 1 wherein the one or more processors are further configured to determine whether to write state information associated with an application resident in the physical memory.

14. The system of claim 1 wherein the one or more processors are configured to selectively read the physical memory based at least in part on a step value.

15. The system of claim 1 wherein the one or more processors are configured to determine the result at least in part by using an accumulator.

16. The system of claim 1 wherein the one or more processors are configured to read only one half or fewer of the cells of the physical memory.

17. The system of claim 1 wherein the one or more values includes a cryptographic value.

18. The system of claim 17 wherein the cryptographic value comprises a cryptographic seed value for a pseudorandom number generator.

19. The system of claim 17 wherein the cryptographic value comprises a cryptographic key value.

20. The system of claim 17, wherein the function is based at least in part on the one or more cryptographic values.

21. The system of claim 1 wherein the first unit comprises a proxy.

22. The system of claim 21, wherein the first unit comprises a subscriber identity module configured to serve as the proxy.

23. The system of claim 21 wherein the proxy comprises a software proxy.

24. The system of claim 23, wherein the step value is included in the initialization information.

25. The system of claim 1, wherein the second unit and a device associated with the physical memory are collocated.

26. The system of claim 1, wherein the second unit is external to a device associated with the physical memory.

27. The system of claim 1 wherein the second and third units comprise respective first and second verifiers.

28. The system of claim 27 wherein the first and second verifier are the same.

29. The system of claim 27 wherein the first and second verifier are different.

30. The system of claim 1 wherein the one or more processors are further configured to receive a grant of access to a resource that is based at least in part on the security determination.

31. The system of claim 30 wherein grant of access permits decryption of information.

32. The system of claim 30 wherein the resource is associated with a network entity.

33. The system of claim 1, wherein the security determination is associated with detection of at least one of malware, jailbreaking, pirated content, and modification of software included in the physical memory from an expected configuration.

34. A method, comprising:
receiving one or more hardware parameters that correspond to a hardware configuration and receiving, from a first unit, initialization information, wherein the initialization information includes a value provided by a second unit;
selectively writing, using one or more processors, to a set of cells of the physical memory in accordance with a function;
selectively reading a physical memory and determining at least one result; and
providing the result to the first unit, wherein the first unit is configured to generate a timing measure associated with the result, and wherein the first unit is further configured to provide the result and the timing measure to a third unit;
wherein the third unit is configured to generate a security determination based at least in part on the result and the timing measure.

35. A system, comprising:
a physical memory; and
one or more processors configured to:
receive one or more hardware parameters that correspond to a hardware configuration and receive, from a first unit, initialization information, wherein the initialization information includes a value provided by a second unit;
perform a sequence of modifications to the physical memory;
provide results to the first unit, wherein the first unit is configured to generate a timing measure associated with the result, and wherein the first unit is further configured to provide the result and the timing measure to a third unit, wherein the third unit is configured to generate a security determination based at least in part on the result and the timing measure; and
perform a scan once it is determined that no evasive software is active in the physical memory;
wherein the scan is performed based at least in part on one or more criteria received from at least one of the second unit and the third unit.

36. The system of claim 35 wherein the one or more processors are further configured to perform an action based at least in part on a result of the scan.

* * * * *